United States Patent
Kim et al.

(10) Patent No.: US 12,393,398 B2
(45) Date of Patent: Aug. 19, 2025

(54) APPARATUS AND METHOD FOR SIGNAL PROCESSING

(71) Applicant: SAMSUNG ELECTRONICS CO., LTD., Suwon-si (KR)

(72) Inventors: Cheheung Kim, Yongin-si (KR); Hyunwook Kang, Daejeon (KR); Hyeokki Hong, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 329 days.

(21) Appl. No.: 17/741,928

(22) Filed: May 11, 2022

(65) Prior Publication Data

US 2022/0391170 A1    Dec. 8, 2022

(30) Foreign Application Priority Data

Jun. 4, 2021   (KR) .................... 10-2021-0072967
Dec. 2, 2021   (KR) .................... 10-2021-0171204

(51) Int. Cl.
*G06F 3/16*    (2006.01)
*G06F 1/16*    (2006.01)
(Continued)

(52) U.S. Cl.
CPC .............. *G06F 3/167* (2013.01); *G06F 1/163* (2013.01); *G06F 3/016* (2013.01); *G10L 25/93* (2013.01);
(Continued)

(58) Field of Classification Search
CPC .......... G06F 3/167; G06F 1/163; G06F 3/016; G10L 25/93; G10L 2025/937; H04R 1/08
See application file for complete search history.

(56) References Cited

U.S. PATENT DOCUMENTS 9,134,856 B2 *  9/2015  Murakoshi .......... G06F 3/03545
9,223,403 B2 * 12/2015  Araki .................. G06F 3/04883
(Continued)

FOREIGN PATENT DOCUMENTS

JP      2003-505718 A    2/2003
JP         6668170 B2    3/2020
(Continued)

OTHER PUBLICATIONS

Pan, Shijia, Ceferino Gabriel Ramirez, Mostafa Mirshekari, Jonathon Fagert, Albert Jin Chung, Chih Chi Hu, John Paul Shen, Hae Young Noh, and Pei Zhang, "SurfaceVibe: Vibration-Based Tap & Swipe Tracking on Ubiquitous Surfaces", Apr. 2017, IPSN 2017, pp. 197-208. (Year: 2017).*

(Continued)

*Primary Examiner* — Daniel C Washburn
*Assistant Examiner* — James Boggs
(74) *Attorney, Agent, or Firm* — Sughrue Mion, PLLC

(57) ABSTRACT

A signal processing apparatus includes a frequency detector configured to receive a user input including at least one of a vibration input and a user voice, vibrate in response to the received user input, and detect a frequency of the received user input, based on the vibration, and a processor configured to determine a type of the user input received by the frequency detector, based on the frequency detected by the frequency detector, and perform a function corresponding to the user input of the determined type.

15 Claims, 36 Drawing Sheets

(51) Int. Cl.
*G06F 3/01* (2006.01)
*G10L 25/93* (2013.01)
*H04R 1/08* (2006.01)

(52) U.S. Cl.
CPC .......... *H04R 1/08* (2013.01); *G10L 2025/937* (2013.01)

(56) References Cited

U.S. PATENT DOCUMENTS

| | | | |
|---|---|---|---|
| 9,503,800 B2 | 11/2016 | Song et al. | |
| 9,753,311 B2 | 9/2017 | Fan | |
| 10,062,388 B2 | 8/2018 | Ady et al. | |
| 10,115,370 B2* | 10/2018 | Min | G06F 3/048 |
| 10,185,356 B2* | 1/2019 | Norieda | G06F 1/1626 |
| 10,225,662 B2* | 3/2019 | Kim | H04R 29/00 |
| 10,241,583 B2* | 3/2019 | Lopez Meyer | G06F 3/043 |
| 10,429,923 B1 | 10/2019 | Johnston et al. | |
| 10,573,323 B2* | 2/2020 | Huang | G10L 17/26 |
| 10,969,873 B2* | 4/2021 | Tan | G06F 3/165 |
| 11,287,917 B2* | 3/2022 | Dahl | G01H 9/00 |
| 11,328,740 B2* | 5/2022 | Lee | G06F 17/18 |
| 11,343,612 B2* | 5/2022 | Zyskowski | H04R 5/033 |
| 2013/0133431 A1* | 5/2013 | Manabe | G01H 11/06 73/649 |
| 2014/0003611 A1 | 1/2014 | Mohammad et al. | |
| 2014/0270244 A1 | 9/2014 | Fan | |
| 2014/0278394 A1 | 9/2014 | Bastyr et al. | |
| 2015/0341717 A1 | 11/2015 | Song et al. | |
| 2016/0370861 A1* | 12/2016 | Ikeda | G06F 3/017 |
| 2017/0116995 A1 | 4/2017 | Ady et al. | |
| 2017/0242527 A1* | 8/2017 | Qutub | G06F 3/044 |
| 2017/0351325 A1 | 12/2017 | Hashimoto | |
| 2019/0122690 A1 | 4/2019 | Kim et al. | |
| 2019/0174244 A1 | 6/2019 | Kim et al. | |
| 2020/0077179 A1 | 3/2020 | Wang | |
| 2022/0392479 A1 | 12/2022 | Kim et al. | |
| 2023/0238127 A1* | 7/2023 | Oplinger | A61N 1/372 607/1 |

FOREIGN PATENT DOCUMENTS

| | | |
|---|---|---|
| KR | 10-2195773 B1 | 12/2020 |
| KR | 10-2223278 B1 | 3/2021 |

OTHER PUBLICATIONS

Chen, Wenqiang, Maoning Guan, Yandao Huang, Lu Wang, Rukhsana Ruby, Wen Hu, and Kaishun Wu, "A Low Latency On-Body Typing System through Single Vibration Sensor," Nov. 2020, IEEE Transactions on Mobile Computing, vol. 19, No. 11, pp. 2520-2532. (Year: 2020).*

Maruri, Héctor Cordourier, Paulo Lopez-Meyer, Jonathan Huang, Willem Marco Beltman, Lama Nachman, and Hong Lu, "V-Speech: Noise-Robust Speech Capturing Glasses Using Vibration Sensors", Dec. 2018, Proceedings of the ACM on Interactive, Mobile, Wearable and Ubiquitous Technologies, vol. 2, No. 4. (Year: 2018).*

Lee, Lik-Hang, and Pan Hui, "Interaction Methods for Smart Glasses: A Survey", Jun. 2018, IEEE Access, vol. 6, pp. 28712-28732. (Year: 2018).*

Liu, Jian, Yingying Chen, Marco Gruteser, and Yan Wang, "VibSense: Sensing Touches on Ubiquitous Surfaces through Vibration", Jun. 2017, 14th Annual IEEE International Conference on Sensing, Communication, and Networking (SECON 2017), pp. 1-9. (Year: 2017).*

Han, Teng, David Ahlström, Xing-Dong Yang, Ahmad Byagowi, and Pourang Irani, "Exploring Design Factors for Transforming Passive Vibration Signals into Smartwear Interactions", Oct. 2016, Proceedings of the 9th Nordic Conference on Human-Computer Interaction, pp. 1-10. (Year: 2016).*

* cited by examiner

APPARATUS AND METHOD FOR SIGNAL PROCESSING

CROSS-REFERENCE TO RELATED APPLICATIONS

This application is based on and claims priority under 35 U.S.C. § 119 to Korean Patent Application No. 10-2021-0072967, filed on Jun. 4, 2021, and Korean Patent Application No. 10-2021-0171204, filed on Dec. 2, 2021, in the Korean Intellectual Property Office, the disclosures of which are incorporated by reference herein in their entirety.

BACKGROUND

1. Field

The disclosure relates to an apparatus and method for signal processing.

2. Description of Related Art

A vibration sensor that is installed in various electronic devices and senses a vibration input and an acoustic sensor that is installed in various electronic devices and detects a user's voice are increasingly being used. However, individual sensors are used to sense different types of user inputs, and thus process costs, complexity, and power consumption increase. The complexity of calculations also increases in a process of receiving and processing signals, according to a vibration input and a user's voice, from individual sensors. Accordingly, a technology for clearly and efficiently sensing various types of user inputs is required.

SUMMARY

Provided are an apparatus and method for signal processing. Provided are non-transitory computer-readable recording media having recorded thereon computer programs, which, when executed by a computer, perform the methods.

Additional aspects will be set forth in part in the description which follows and, in part, will be apparent from the description, or may be learned by practice of embodiments of the disclosure.

In accordance with an aspect of the disclosure, a signal processing apparatus includes a frequency detector configured to receive a user input including at least one of a vibration input and a user voice; vibrate in response to the received user input; and detect a frequency of the user input, based on the vibration; and a processor configured to determine a type of the user input received by the frequency detector, based on the frequency detected by the frequency detector; and perform a function corresponding to the user input of the determined type.

The frequency detector may include a plurality of vibration structures that sense vibration inputs and sounds of different frequency bands, and each of the plurality of vibration structures may include a vibrator configured to vibrate based on the frequency of the user input as the user input is received.

Each of the plurality of vibration structures may further include a vibration detector configured to receive a vibration of the vibrator and generate an electrical signal corresponding to the received vibration.

The processor may be further configured to determine that the type of the received user input is the vibration input when the detected frequency is in a first frequency band; and determine that the type of the received user input is the user voice when the detected frequency is in a second frequency band.

The processor may be further configured to determine that the type of the received user input is the user voice when the received user input lasts longer than a first length of time and the frequency of the received user input is in the second frequency band.

The processor may be further configured to determine that the type of the received user input is the vibration input when the frequency of the received user input is in an overlapping frequency band that is in both the first frequency band and the second frequency band while the received user input lasts.

The processor may be further configured to determine that the type of the received user input is the user voice when the frequency of the received user input is in both the first frequency band and in a portion of the second frequency band not overlapping the first frequency band.

The first frequency band may correspond to a resonance frequency band of a housing of the signal processing apparatus, and the second frequency band may correspond to a voice grade.

The first frequency band may be 300 Hz to 500 Hz, and the second frequency band may be 300 Hz to 3400 Hz.

The vibration input may include at least one of a tap input, a swipe input, and a bone conduction input.

The processor may be further configured to determine that the type of the received user input is the tap input when the frequency of the user input is in the first frequency band while the received user input lasts, and a duration of the user input is less than or equal to a first length of time, and determine that the type of the user input is the swipe input or the bone conduction input when the duration of the user input exceeds the first length of time.

The processor may be further configured to determine that the type of the received user input is the tap input when the frequency of the user input is in the first frequency band while the received user input lasts, and a magnitude of an electrical signal generated by the frequency detector, based on the vibration, is equal to or greater than a threshold level, and determine that the type of the user input is the swipe input or the bone conduction input when the magnitude of the electrical signal is less than the threshold level.

The processor may be further configured to perform a first function corresponding to the user voice and a second function corresponding to the vibration input when the received user input is determined to include both the user voice and the vibration input.

The processor may be further configured to identify a user who uses the signal processing apparatus, based on a combination of the user voice and the vibration input.

The signal processing apparatus may further include a display configured to output visual information, and the processor may be further configured to control the display to display results of performing the first function corresponding to the user voice and the second function corresponding to the vibration input on different regions on the display.

The signal processing apparatus may include an eyeglass wearable device, and the frequency detector may be arranged on an eyeglass frame of the eyeglass wearable device.

In accordance with an aspect of the disclosure, a signal processing method includes receiving a user input including at least one of a vibration input and a user voice; vibrating in response to the received user input; detecting a frequency of the received user input, based on the vibration; detecting a type of the received user input, based on the detected frequency; and performing a function corresponding to the user input of the determined type.

The vibrating in response to the received user input may include vibrating based on the frequency of the received user input, wherein the vibrating is performed by a plurality of vibration structures for sensing vibration inputs and sounds of different frequency bands.

The detecting of the frequency of the received user input may further include generating an electrical signal corresponding to a vibration of each of the plurality of vibration structures.

The determining of the type of the received user input may include determining that the type of the received user input is the vibration input when the detected frequency is in a first frequency band, and determining that the type of the received user input is the user voice when the detected frequency is in a second frequency band.

The determining of the type of the received user input may further include determining that the type of the received user input is the user voice when the received user input lasts longer than a first length of time and the frequency of the lasting user input is in the second frequency band.

The determining of the type of the received user input may further include determining that the type of the received user input is the vibration input when the frequency of the received user input is in an overlapping frequency band that is in both the first frequency band and the second frequency band while the received user input lasts.

The determining of the type of the received user input may further include determining that the type of the received user input is the user voice when the frequency of the received user input is in both the first frequency band and in a portion of the second frequency band not overlapping the first frequency band.

The determining of the type of the received user input may further include determining that the type of the received user input is a tap input when the frequency of the received user input is in the first frequency band while the received user input lasts, and a duration of the user input is less than or equal to a first length of time, and determining that the type of the received user input is a swipe input or a bone conduction input when the duration of the received user input exceeds the first length of time.

The determining of the type of the received user input may further include determining that the type of the received user input is a tap input when the frequency of the received user input is in the first frequency band while the received user input lasts, and a magnitude of an electrical signal generated based on the vibration is equal to or greater than a threshold level, and determining that the type of the user input is a swipe input or a bone conduction input when the magnitude of the electrical signal is less than the threshold level.

The performing of the function corresponding to the user input of the determined type may include performing a first function corresponding to the user voice and a second function corresponding to the vibration input when the received user input is determined to include both the user voice and the vibration input.

The performing of the function corresponding to the user input of the determined type may include identifying a user, based on a combination of the user voice and the vibration input.

The performing of the function corresponding to the user input of the determined type may include displaying results of performing a first function corresponding to the user voice and a second function corresponding to the vibration input on different regions on a display.

A non-transitory computer-readable recording medium may have recorded thereon a computer program, which, when executed by a computer, performs the method of an above-noted aspect of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
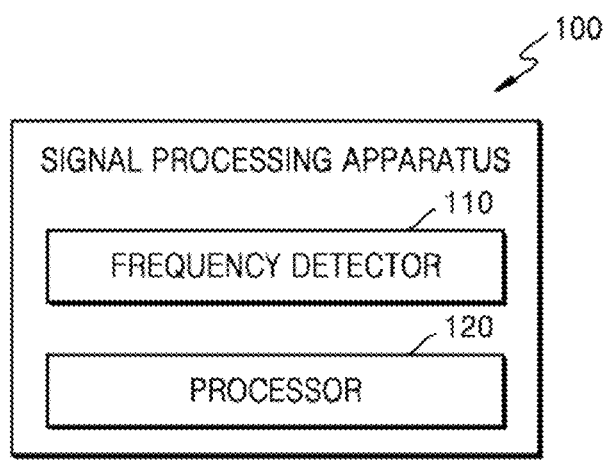
FIG. 1 is a block diagram of a structure of a signal processing apparatus according to an embodiment.

Reference will now be made in detail to embodiments, examples of which are illustrated in the accompanying drawings, wherein like reference numerals refer to the like elements throughout. In this regard, embodiments may have different forms and should not be construed as being limited to the descriptions set forth herein. Accordingly, embodiments are merely described below, by referring to the figures, to explain aspects of the present description. As used herein, the term "and/or" includes any and all combinations of one or more of the associated listed items. Expressions such as "one or more of," when preceding a list of elements, modify the entire list of elements and do not modify the individual elements of the list.

Although general terms widely used at present were selected for describing the disclosure in consideration of the functions thereof, these general terms may vary according to intentions of one of ordinary skill in the art, case precedents, the advent of new technologies, or the like. Terms arbitrarily selected by the applicant of the disclosure may also be used in a specific case. In this case, their meanings need to be given in the detailed description. Hence, the terms must be defined based on their meanings and the contents of the entire specification, not by simply stating the terms.

Throughout the descriptions of embodiments, when an element is referred to as being "connected" or "coupled" to another element, it can be directly connected or coupled to the other element, or can be electrically connected or coupled to the other element with intervening elements interposed therebetween. The terms "comprises" and/or "comprising" or "includes" and/or "including" when used in this specification, specify the presence of stated elements, but do not preclude the presence or addition of one or more other elements.

Terms "configured" or "include" used herein should not be construed as necessarily including all of several components or several steps written in the specification, but as not including some of the components or steps or as further including additional components or steps.

While such terms as "first", "second", etc., may be used to describe various components, such components must not be limited to the above terms. The above terms are used only to distinguish one component from another.

The descriptions of embodiments below should not be construed as limiting the right scope of the accompanying claims, and it should be construed that all of the technical ideas included within the scope equivalent to the claims are included within the right scope of embodiments. Example embodiments of the disclosure will now be described more fully with reference to the accompanying drawings.

FIG. 1 is a block diagram of a structure of a signal processing apparatus according to an embodiment.

Referring to FIG. 1, a signal processing apparatus 100 may include a frequency detector 110 and a processor 120. FIG. 1 illustrates only components of the signal processing apparatus 100 that are relevant to embodiments. Accordingly, it will be obvious to one of ordinary skill in the art that the signal processing apparatus 100 may further include general-use components other than those shown in FIG. 1.

The signal processing apparatus 100 may be a wearable device worn by a user to receive a user input. Alternatively, the signal processing apparatus 100 may not be worn by a user, and may be arranged adjacent to a sound output apparatus or may be included in the sound output apparatus. For example, when the signal processing apparatus 100 is included in a sound output apparatus, the user may perform functions by the signal processing apparatus 100 by inputting a user input to the sound output apparatus.

However, this is merely an example, and the signal processing apparatus 100 may be implemented by being modified in various forms capable of receiving a user input. Examples of the signal processing apparatus 100 will be described later with reference to FIG. 19A.

The frequency detector 110 may receive a user input including at least one of a vibration input and a user voice. The frequency detector 110 may vibrate in response to the received user input. Vibration of the frequency detector 110 will be described later with reference to FIG. 2.

The frequency detector 110 may detect frequency information of the received user input, based on the vibration according to the received user input. For example, the frequency detector 110 may detect information including the amplitude, intensity, or the like according to time, for each frequency band of a user input received based on a vibration of each vibrator.

A vibration input may be an input generated when a user using or wearing the signal processing apparatus 100 contacts the signal processing apparatus 100, or may be an input transmitted when a vibration is generated on an already-contacted body part. For example, the vibration input may include a tap input, a swipe input, or a bone conduction input. The bone conduction input refers to transmission of a vibration through a skull, and may correspond to a vibration input generated via a movement of a face, air conduction within a skull, or the like when the signal processing apparatus 100 is worn on a face. Various examples of the bone conduction input will be described later with reference to FIGS. 21C through 21F.

The frequency detector 110 may receive external sound generated outside the user, in addition to receiving the user input. For example, the frequency detector 110 may receive overall sound including a user voice and external sound. The user voice may correspond to the voice of the user who uses or wears the signal processing apparatus 100. The external sound is a sound received from the outside of the user, and may correspond to a sound excluding the user voice. For example, the external sound may include a voice of an outsider having a conversation with the user, a sound output from an image viewed by the user, or a sound generated in an environment around the user. The overall sound is a sound including both the user voice and the external sound, and may correspond to all sounds transmitted to (or received from) a signal processing apparatus. The overall sound may be transmitted to (or received from) the frequency detector 110, but the external sound may be attenuated from the overall sound by a structure or operation of the frequency detector 110, and thus a user voice signal may be generated.

The frequency detector 110 may convert the received sound into an electrical signal including information such as a frequency, amplitude, and time.

The frequency detector 110 may generate the user voice signal by attenuating the external sound from the received overall sound. The frequency detector 110 may generate a user voice signal in which a user voice is made clearer, by attenuating the external sound. For example, the frequency detector 110 may attenuate a signal having directivity to the user voice or corresponding to the external sound, based on a threshold value, in order to attenuate the received external sound. The structure and operation of the frequency detector 110 will be described later with reference to FIG. 2.

The frequency detector 110 may receive sound through one surface formed by the frequency detector 110. The one surface may refer to a surface formed by a vibrator of the frequency detector 110 or may refer to a surface formed by a plurality of vibrators arranged in a two-dimensional (2D) manner. The frequency detector 110 may be arranged within the signal processing apparatus 100 such that the surface formed by the frequency detector 110 is arranged in a direction corresponding to a typical or expected utterance point of the user voice. Due to this arrangement of the frequency detector 110, the user voice may be sensed with a high sensitivity and the external sound may be sensed with a low sensitivity. Accordingly, the external sound may be attenuated from the overall sound received by the frequency detector 110, and the user voice signal, which is a sound signal generated by the frequency detector 110, may be a signal in which the external sound has been attenuated.

For example, the frequency detector 110 may be arranged in the signal processing apparatus 100 such that an angle between one surface receiving the overall sound and a direction from the utterance point of the user voice to the one surface is about 60° to about 120°. The arrangement of the frequency detector 110 (or the vibrator of the frequency detector 110) will be described later with reference to FIGS. 10A and 10B.

The processor 120 may determine a type of the user input received by the frequency detector 110, based on the frequency information detected by the frequency detector 110. Because the user input includes at least one of the vibration input and the user voice, the processor 120 may determine whether the received user input is the vibration input or the user voice or includes both the vibration input and the user voice. A method, performed by the processor 120, of determining the user input will be described later with reference to FIG. 13 and others.

The processor 120 may perform a function corresponding to a user input of the determined type. For example, the processor 120 may perform a function corresponding to a vibration input, a function corresponding to a user voice, or functions respectively corresponding to the two input types. The processor 120 may perform a function corresponding to a combination of the vibration input and the user voice. The processor 120 may identify the user, based on a combination of the vibration input and the user voice. Because users have different voices and provide different movements of the skins in contact with the signal processing apparatus 100 and different bone conductions during utterance, the processor 120 may perform user authentication by identifying the user, based on the combination of the vibration input and the user voice.

The processor 120 may be implemented by an array of a plurality of logic gates, or by a combination of a general-use microprocessor and a memory in which a program executable by the general-use microprocessor is stored. It will also be understood by one of ordinary skill in the art to which the embodiment pertains that the processor 120 may be implemented by other types of hardware.

The signal processing apparatus 100 may sense both the user voice and the vibration input by using one sensor called the frequency detector 110, without using both of a special acoustic sensor and a special vibration sensor in order to sense the user voice and the vibration input. Accordingly, the signal processing apparatus 100 does not require comparisons and calculations with respect to signals generated from special sensors, thus enabling efficient processing. Moreover, the signal processing apparatus 100 senses the user voice and the vibration input by using only the frequency detector 110, thus enabling reductions in process costs and power consumption and achieving device miniaturization.

Figure 2:
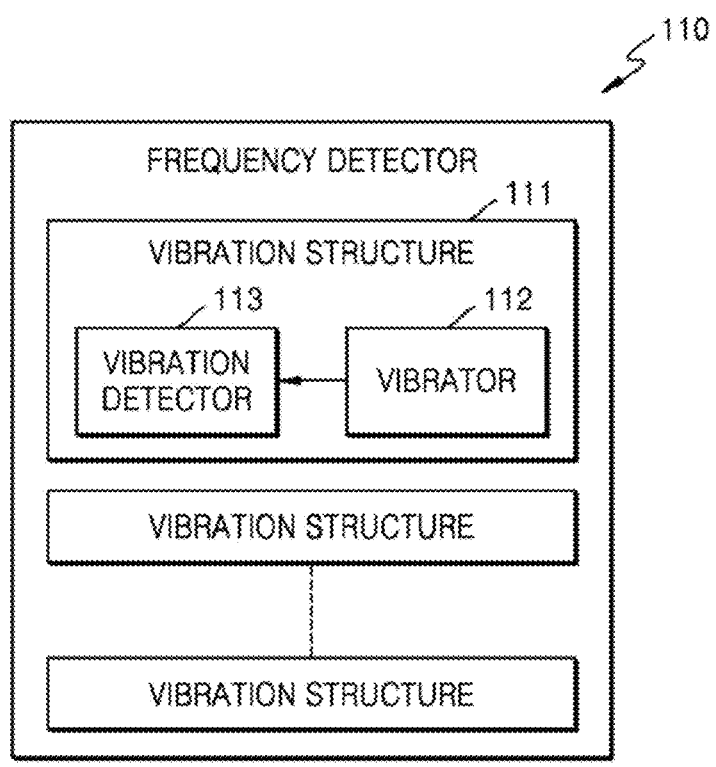
FIG. 2 is a block diagram of a structure of a frequency detector according to an embodiment.

FIG. 2 is a block diagram of a structure of the frequency detector 110 according to an embodiment.

Referring to FIG. 2, the frequency detector 110 may include a plurality of vibration structures 111. Each of the vibration structures 111 may include a vibrator 112 and a vibration detector 113. Only components related with embodiments from among the components of the frequency detector 110 are shown in FIG. 2. Accordingly, it is obvious to one of ordinary skill in the art that the frequency detector 110 may further include general-use components other than those shown in FIG. 2. For example, the frequency detector 110 may further include a support, a sound adjuster, or the like.

The frequency detector 110 may include a plurality of vibration structures that sense vibration inputs and sounds of different frequency bands. The plurality of vibration structures may be formed in different shapes (e.g., a length, a thickness, a shape, or a weight) and may have resonance frequencies corresponding to the shapes. The plurality of vibration structures may sense a vibration input and sound of a frequency band corresponding to each resonance frequency. A detailed structure of the vibration structure 111 will be described later with reference to FIGS. 3 and 4A.

The vibrator 112 may vibrate in response to a user input. For example, the vibrator 112 may vibrate in response to a user input of a frequency close to a resonance frequency. The vibrator 112 may form one surface that receives a vibration input or sound. As vibrators are arranged in a 2D manner within the frequency detector 110, the frequency detector 110 may form one surface corresponding to a plurality of surfaces of the vibrators. The vibrator 112 may vibrate in a direction orthogonal to the one surface, in response to a vibration input or sound, based on the frequency of the received vibration input or sound. The one surface formed by the vibrator 112 will be described later with reference to FIG. 4A.

The vibration detector 113 may receive a vibration of the vibrator 112 and may generate an electrical signal corresponding to the received vibration. As the vibration is converted into the electrical signal by the vibration detector 113, a signal processing apparatus may perform various processing and calculations with respect to a received user input.

Figure 3:
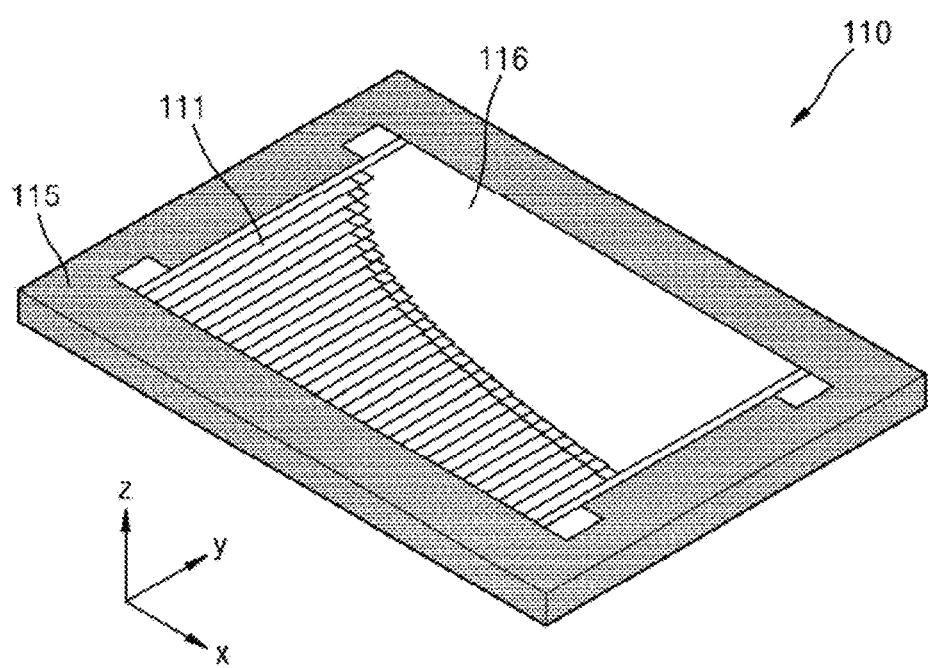
FIG. 3 illustrates a structure of the frequency detector.

FIG. 3 illustrates a structure of the frequency detector 110.

Referring to FIG. 3, the frequency detector 110 may include a support 115 and the plurality of vibration structures 111. The support 115 may be formed to penetrate through a cavity 116. A silicon substrate, for example, may be used as the support 115, but embodiments of the disclosure are not limited thereto.

The plurality of vibration structures 111 may be arranged in a certain shape on the cavity 116 of the support 115. The vibration structures 111 may be arranged on a plane without overlapping each other. Each of the vibration structures 111 may have one end fixed to the support 115 and the other end extending toward the cavity 116, as illustrated in FIG. 3.

The vibration structures 111 may be provided to sense, for example, vibration input frequencies and acoustic frequencies of different bands. In other words, the vibration structures 111 may have different center frequencies or resonance frequencies. To this end, the vibration structures 111 may be provided to have different dimensions. Dimensions of the vibration structures 111 may be set in consideration of desired resonance frequencies for the vibration structures 111.

Figure 4A:
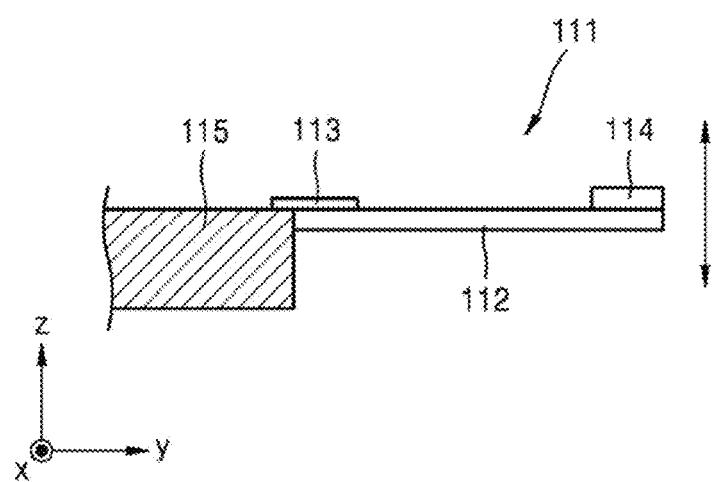
FIGS. 4A through 4C are cross-sectional views of a vibration structure of FIG. 3.
Figure 4B:
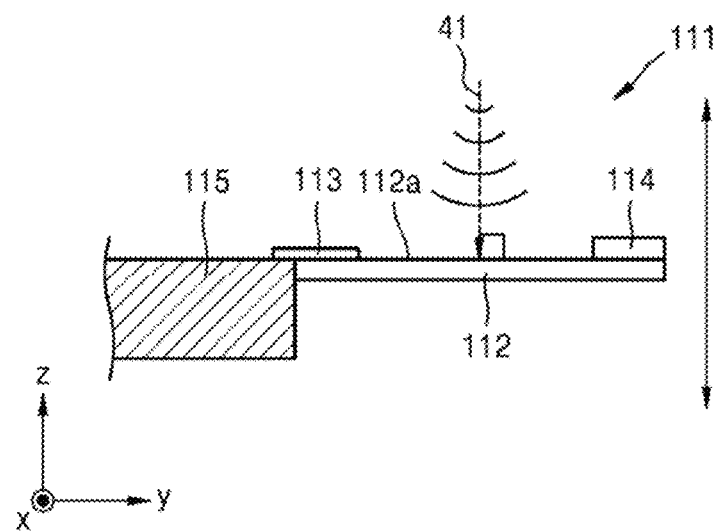
Figure 4C:
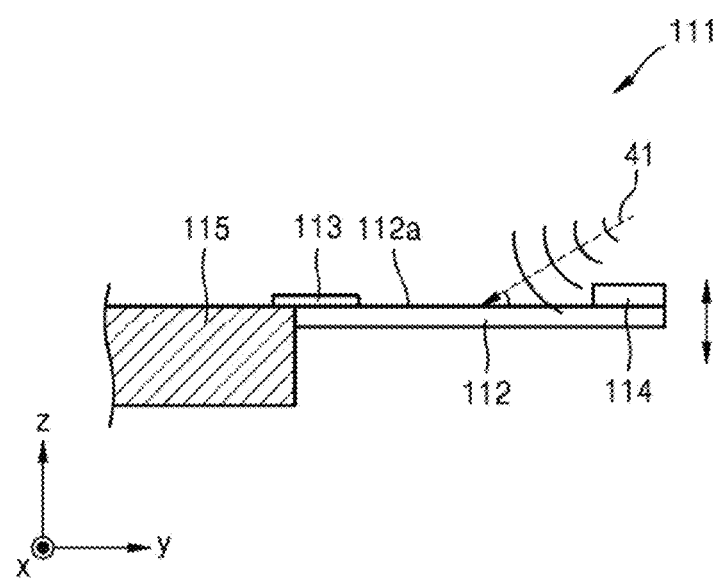

FIGS. 4A through 4C are cross-sectional views of the vibration structure 111 of FIG. 3.

Referring to FIG. 4A, the vibration structure 111 may include the vibrator 112, the vibration detector 113, and mass 114. The vibration structure 111 may have one end fixed to the support 115 and the other end extending toward a cavity, as illustrated in FIGS. 4A through 4C.

Each vibration structure 111 may include the vibrator 112 vibrating in response to a received user input, and the vibration detector 113 sensing a movement of the vibrator 112. The vibration structure 111 may further include the mass 114 for providing a certain amount of mass to the vibrator 112.

The vibrator 112 may vibrate based on the frequency of a received vibration input or sound. The vibrator 112 may greatly vibrate as the frequency of the received vibration input or sound approaches a resonance frequency, and may have a small vibration as the frequency of the received vibration input or sound moves away from the resonance frequency. Alternatively, the vibrator 112 may vibrate when a vibration input or sound of a sensible frequency band is received, and may not vibrate when a vibration input or sound deviating from the sensible frequency band is received.

Referring to FIGS. 4B and 4C, the vibrator 112 may form one surface 112a that receives a vibration input and sound.

The vibrator 112 may vibrate in a direction orthogonal to the one surface 112a, in response to the vibration input or sound. The vibrator 112 may vibrate with an intensity based on an angle formed by a propagation direction 41 of the received sound and the one surface 112a. The vibrator 112 may vibrate with a large vibration intensity as the angle formed by the propagation direction 41 of the received sound and the one surface 112a approaches 90°, and may vibrate with a small vibration intensity as the angle formed by the propagation direction 41 of the received sound and the one surface 112a approaches 0°.

As shown in FIG. 4B, in response to sound propagated at an angle of 90° with respect to the one surface 112a, the vibrator 112 may vibrate with a largest vibration intensity. As shown in FIG. 4C, in response to sound propagated at a smaller angle than 90° with respect to the one surface 112a, the vibrator 112 may vibrate with a smaller vibration intensity than FIG. 4B.

Due to the vibration operation of the vibrator 112, a frequency detector (or vibration structures) may be arranged within a signal processing apparatus in consideration of the propagation direction 41 of the sound. For example, the frequency detector may be arranged in the signal processing apparatus so that a user voice is propagated to the one surface 112a at an angle close to 90°. In other words, the frequency detector may be arranged such that the one surface 112a is oriented toward an utterance point of the user voice, and this arrangement will be described later with reference to FIGS. 10A and 10B.

Figure 5:
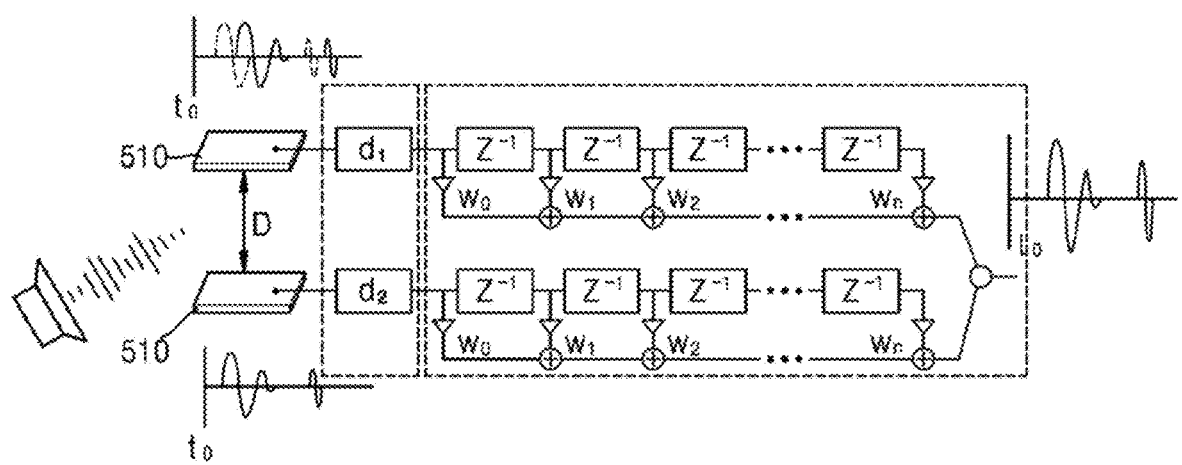
FIG. 5 is a view for explaining a sound sensing method using ambient microphones, according to a comparative example.

FIG. 5 is a view for explaining a sound sensing method using ambient microphones according to a comparative example.

The sound sensing method according to a comparative example of FIG. 5 may use a plurality of ambient microphones 510 in order to maximize sound in a certain direction. The plurality of ambient microphones 510 may be arranged at intervals of a certain distance D, a time or phase delay in which sound reaches each of the ambient microphones 510 may occur due to the distance D, and overall directivity may be controlled by varying the degree of compensating for the time or phase delay. This directivity adjusting method may be referred to as a time difference of arrival (TDOA).

However, because the above-described method is based on the premise that there is a difference in the time for sound to arrive at each ambient microphone, the interval needs to be set in consideration of the wavelength of an audible frequency band, and thus there may be a limitation in setting the interval between the ambient microphones 510. Because there is a limitation in setting the interval, there may be a limitation in miniaturization of an apparatus that performs the above-described method. In particular, because a low frequency has a long wavelength, the interval between the ambient microphones 510 may need to be wide, and a signal-to-noise ratio (SNR) of each ambient microphone may need to be high, in order to identify sound of a low frequency.

In addition, in the above-described method, because a phase varies according to the frequency band of sound sensed by each ambient microphone, the phase may need to be compensated for each frequency. In order to compensate for the phase for each frequency, the above-described method may require a complex signal-processing process of applying an appropriate weight to each frequency.

Unlike the comparative example of FIG. 5, a signal processing apparatus according to an embodiment does not have restrictions on the interval between microphones, and may obtain a sound in a specific direction by distinguishing directions only with a simple arithmetic operation without complex signal-processing. Efficient structure and operation of the signal processing apparatus will now be described in detail with reference to the drawings below.

Figure 6:
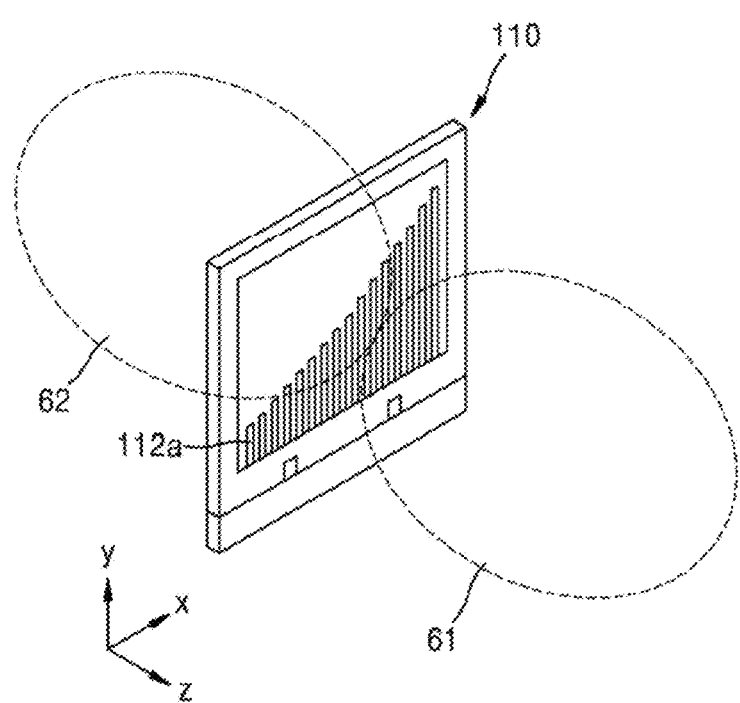
FIG. 6 is a view for explaining a directivity pattern of a frequency detector according to an embodiment.

FIG. 6 is a view for explaining a directivity pattern of a frequency detector according to an embodiment.

Referring to FIG. 6, the frequency detector 110 may have bidirectional directivity patterns 61 and 62. For example, the bidirectional directivity patterns 61 and 62 may be a figure-8 directivity pattern including a front portion 61 oriented toward a front side (+z direction) of the frequency detector 110 and a rear portion 62 oriented toward a rear side (−z direction) of the frequency detector 110.

When sound is perpendicularly propagated to the one surface 112a formed by the vibrator 112, the vibrator 112 may vibrate with a large vibration intensity by responding most sensitively. Accordingly, a directivity pattern based on a front direction (+z direction) and a rear direction (−z direction) of the frequency detector 110, which are perpendicular to the one surface 112a, may be formed. In this case, the frequency detector 110 may respond with a reduced sensitivity with respect to sound received in a direction not oriented with respect to the frequency detector 110 (for example, +x direction and −x direction). Accordingly, the frequency detector 110 may attenuate sound received in the direction not oriented with respect to the frequency detector 110 (for example, +x direction and −x direction).

A unidirectional pattern in the +z direction or the −z direction may be formed by blocking reception of sound by one surface according to the structure of the frequency detector 110. The above-described directivity patterns of the frequency detector 110 are merely examples, and a directivity pattern may be variously modified according to arrangements of vibration structures (or vibrators).

Figure 7:
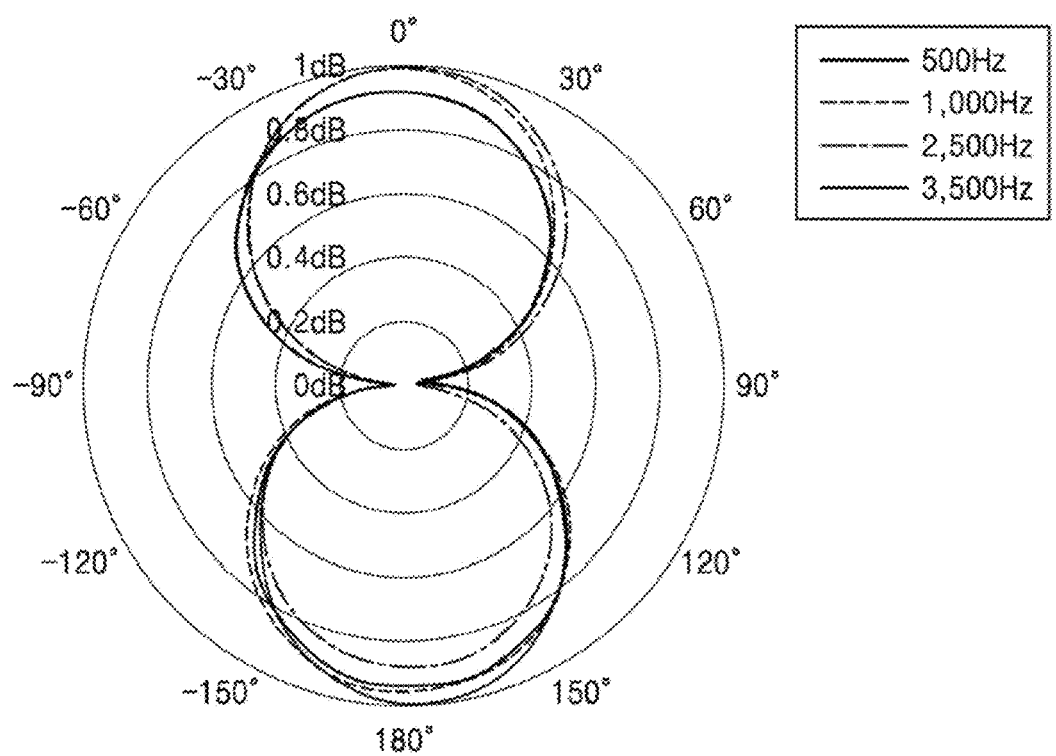
FIG. 7 illustrates a result of a measurement of a directivity pattern of a frequency detector.

FIG. 7 illustrates a result of a measurement of a directivity pattern of a frequency detector.

As shown in FIG. 7, it may be seen that the frequency detector has a uniform bi-directional directivity pattern for various frequencies. In other words, it may be seen that the frequency detector has directionality in the +z-axis direction and the −z-axis direction of FIG. 3, which are a 0° direction and a 180° direction, for various frequencies.

Figure 8:
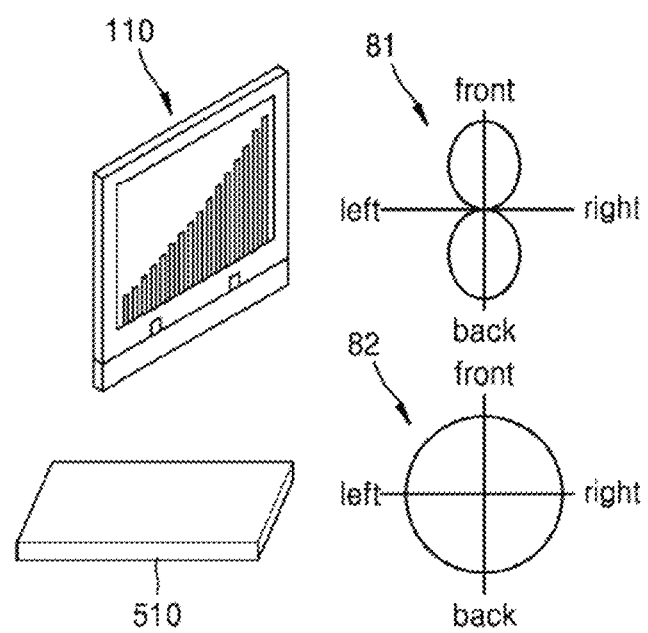
FIG. 8 is a view for explaining signal processing by a signal processing apparatus, according to an embodiment.

FIG. 8 is a view for explaining signal processing by a signal processing apparatus according to an embodiment.

Referring to FIG. 8, the frequency detector 110 may have a bidirectional directivity pattern 81, and an ambient microphone 510 may have an omnidirectional or non-directional directivity pattern 82. The frequency detector 110 may sense sound in phase with the sound sensed by the ambient microphone 510, from a front direction (for example, the +z direction of FIG. 5) of the bidirectional directivity pattern 81, and may sense sound in anti-phase with the sound sensed by the ambient microphone 510, from a rear direction (for example, the −z direction of FIG. 5) of the bidirectional directivity pattern 81. However, the directivity pattern of the frequency detector 110 shown in FIG. 8 is merely an example. As described above, the directivity pattern may be variously modified according to structures of the frequency detector 110 and arrangements of vibration structures (or vibrators).

Figure 9:
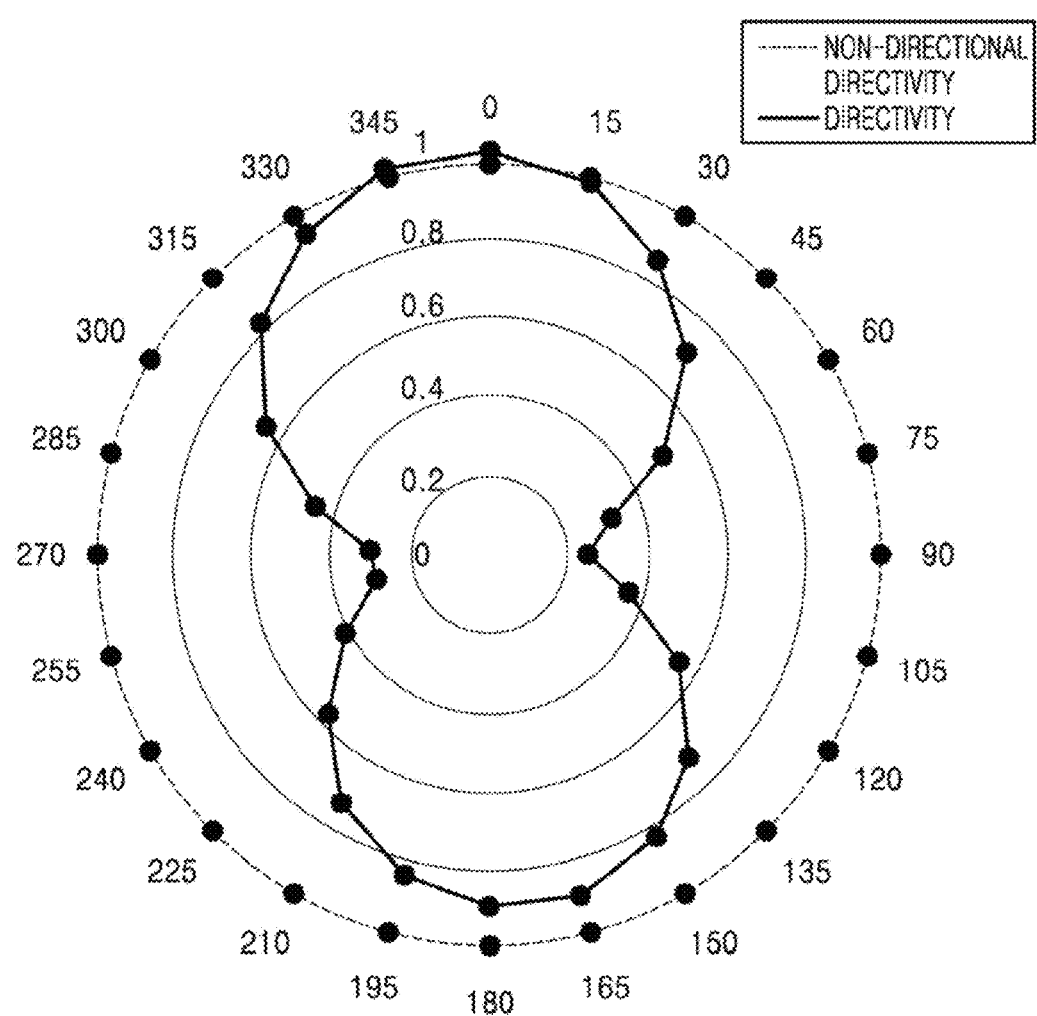
FIG. 9 is a graph showing a result of measuring respective directivity patterns of both of a frequency detector according to an embodiment and an ambient microphone.

FIG. 9 is a graph showing a result of measuring respective directivity patterns of a frequency detector according to an embodiment and an ambient microphone.

Referring to FIG. 9, the frequency detector has a bidirectional directivity pattern, and the ambient microphone has an omni-directional (or non-directional) directivity pattern. For example, the frequency detector may sense sound transmitted by a 330° to 30° (60° to 120° with respect to one surface formed by the frequency detector) region corresponding to a front side (+z direction of FIG. 6), and may sense sound transmitted by a 150° to 210° (240° to 300° with respect to the one surface formed by the frequency detector) region corresponding to a rear side (−z direction of FIG. 6). For example, the frequency detector may sense a sound having a magnitude of approximately 0.85 times as large in a 30° (120° based on the one surface formed by the frequency detector) region as that in a 0° (90° based on the one surface formed by the frequency detector) region.

The ambient microphone may sense sound transmitted from all directions of an ambient 360° region.

The frequency detector may attenuate sound received in a direction close to 90° or 270° (0° based on the one surface formed by the frequency detector). According to the embodiment of FIG. 9, the frequency detector may react with a low sensitivity with respect to sound received in a direction of 60° to 120°, and thus may attenuate the sound in the direction of 60° to 120°.

FIG. 9 illustrates only a result of one frequency. However, as described above with reference to FIG. 7, because the frequency detector may have a uniform sensitivity with respect to various frequencies, results for various frequencies may form directivity patterns having similar shapes. For example, various frequencies may be the frequencies of an audible frequency region, and a directivity pattern having a similar shape may be formed for the frequency detector, regardless of the frequency.

Figure 10A:
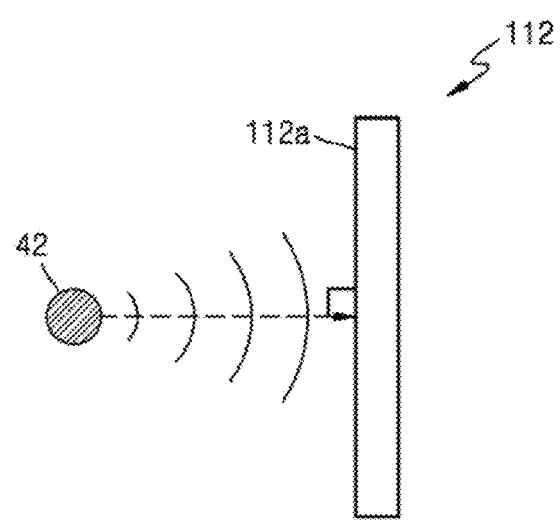
FIGS. 10A and 10B are views illustrating arrangements of a vibrator with respect to an utterance point of a user voice.
Figure 10B:
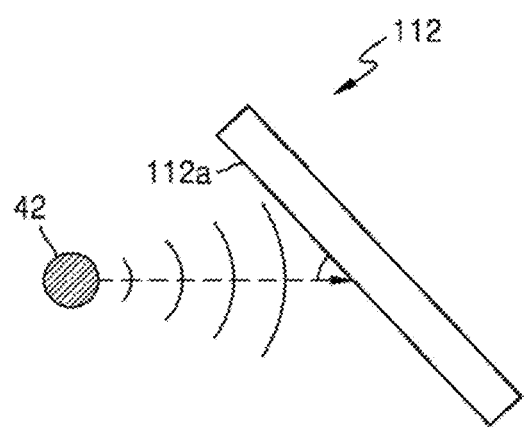

FIGS. 10A and 10B are views illustrating arrangements of a vibrator with respect to an utterance point of a user voice.

Referring to FIGS. 10A and 10B, a user voice propagated from an utterance point 42 of the user voice may be received by the one surface 112a formed by the vibrator 112.

As shown in FIG. 10A, when a propagation direction of the user voice and the one surface 112a formed by the vibrator 112 are perpendicular to each other, the vibrator 112 may respond with a highest sensitivity, and the user voice may be sensed loudest. Thus, the frequency detector may be arranged within a signal processing apparatus such that the one surface 112a formed by the vibrator 112 (or a plurality of vibrators) is arranged in a direction corresponding to the utterance point 42 of the user voice.

In other words, the frequency detector may be arranged such that the one surface 112a formed by the vibrator 112 (or a plurality of vibrators) and a direction from the utterance point 42 of the user voice to the one surface 112a correspond to each other (preferably, form an angle of 90°).

When the one surface 112a and the propagation direction of the user voice form an angle of 90°, sound may be sensed with a highest sensitivity, but several restrictions in process or use may make it difficult to keep the angle at 90°. For example, as shown in FIG. 10B, the propagation direction of the user voice and the one surface 112a may form an angle of less than 90°. However, also in this case, the frequency detector may sense the user voice, as described above with reference to FIG. 9.

The frequency detector may be arranged within the signal processing apparatus at an angle for securing flexibility in process and use and effectively sensing the user voice. The frequency detector may be arranged within the signal processing apparatus such that the one surface 112a formed by the vibrator 112 (or a plurality of vibrators) and the direction from the utterance point 42 of the user voice to the one surface 112a form an angle of 60° to 120°. As described above with reference to FIG. 9, even when the frequency detector receives sound at 60° or 120°, the frequency detector may receive the sound with a magnitude of about 0.85 times as that when the frequency detector receives sound at 90°. Thus, 60° to 120° may be an angle sufficient to provide flexibility in process and use and sense the user voice.

When the frequency detector is arranged to be oriented toward the utterance point 42 of the user voice, the frequency detector may respond, with a low sensitivity, to external sound generated in a place spaced apart from the utterance point 42 of the user voice. Thus, the frequency detector may attenuate the external sound.

An embodiment in which this arrangement of the frequency detector is applied to a signal processing apparatus will be described later with reference to FIG. 19C.

Figure 11:
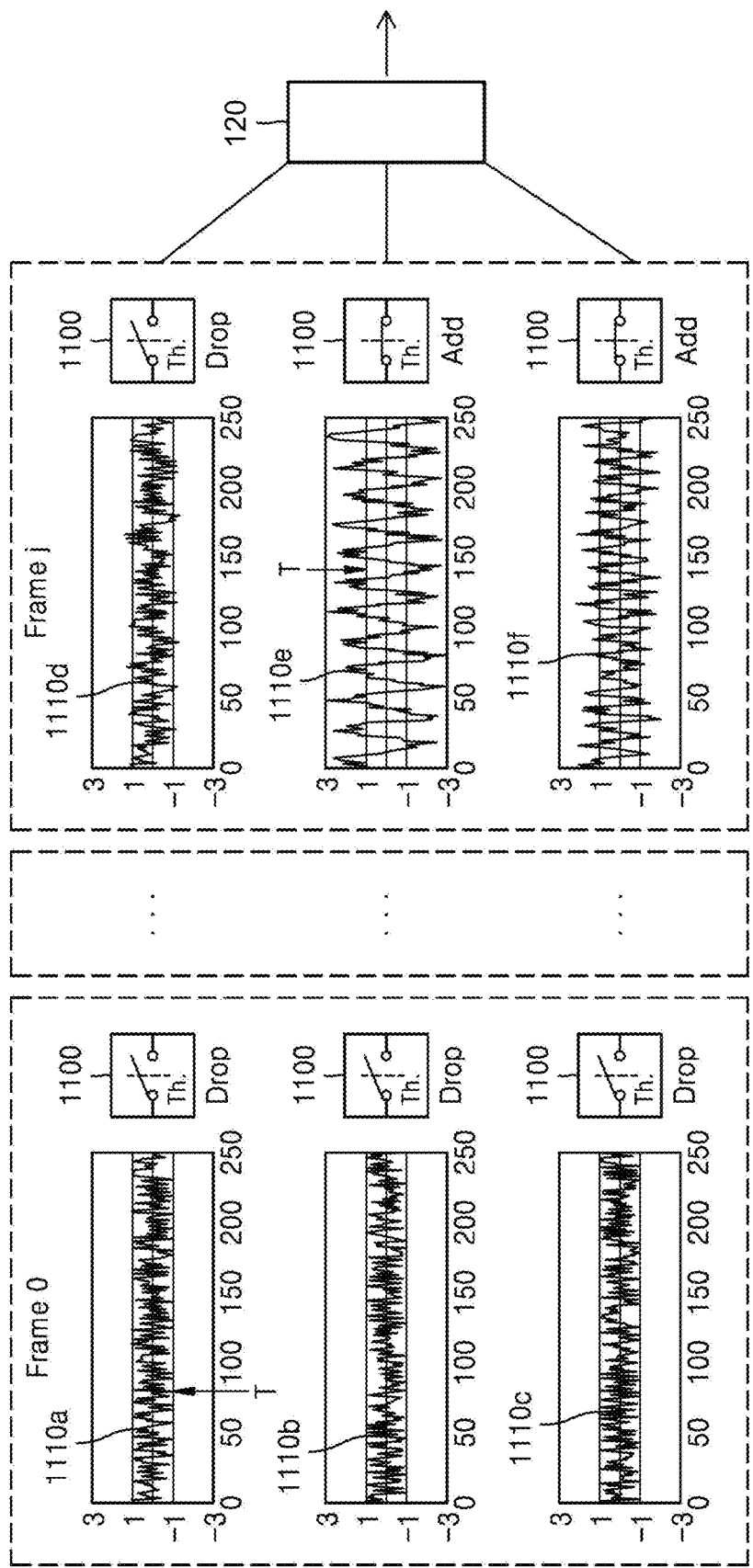
FIG. 11 is a view illustrating a sound adjustment process by a sound adjuster, according to an embodiment.

FIG. 11 is a view illustrating a sound adjustment process by a sound adjuster according to an embodiment.

Referring to FIG. 11, electrical acoustic signal frames 1110a through 1110f generated by three vibration structures that sense different frequency bands are shown in two time frames. Acoustic signal frames may be input to a sound adjuster 1100, and one sound adjuster 1100 may be included in each vibration structure or may be included in a frequency detector.

The sound adjuster 1100 of the frequency detector may determine an electrical signal that is to be attenuated, from among electrical signals generated by vibration structures, based on a threshold value. The sound adjuster 1100 may attenuate the determined electrical signal. The electrical signal that is attenuated may be a signal corresponding to external sound. As the signal corresponding to external sound is attenuated by the sound adjuster 1100, a user voice may be maximized.

"Frame 0" indicates an acoustic signal frame measured during a first time section. "Frame j" indicates an acoustic signal frame measured during a j-th time section, after the first time section. First through third acoustic signal frames 1110a through 1110c are frames measured in the same time section (first time section), and fourth through sixth acoustic signal frames 1110d through 1110f are frames measured in the same time section (j-th time section).

The first and fourth acoustic signal frames 1110a and 1110d may be in the same frequency band, and may be input to the sound adjuster 1100 through the same vibration structure. The second and fifth acoustic signal frames 1110b and 1110e may be in the same frequency band, and may be input to the sound adjuster 1100 through the same vibration structure. The third and sixth acoustic signal frames 1110c and 1110*f* may be in the same frequency band, and may be input to the sound adjuster 1100 through the same vibration structure. The frequency band of the first and fourth acoustic signal frames 1110*a* and 1110*d*, the frequency band of the second and fifth acoustic signal frames 1110*b* and 1110*e*, and the frequency band of the third and sixth acoustic signal frames 1110*c* and 1110*f* are different from one another.

In FIG. 11, "Drop" indicates a case where the sound adjuster 1100 determines an input acoustic signal as an acoustic signal to be attenuated, and "Add" indicates a case where the sound adjuster 1100 does not attenuate the input acoustic signal.

Referring to FIG. 11, when the intensity of an acoustic signal is equal to or less than a threshold value T or exceeds the threshold value T by a degree equal to or less than a set value as in the case of the first through fourth acoustic signal frames 1110*a* through 1110*d*, the sound adjuster 1100 may attenuate the acoustic signal (Drop).

On the other hand, when the intensity of an acoustic signal exceeds the threshold value T and the degree of excess is higher than a preset value as in the case of the fifth and sixth acoustic signal frames 1110*e* and 1110*f*, the sound adjuster 1100 may not attenuate the acoustic signal (Add).

An output result of the sound adjuster 1100 may be transmitted to the processor 120 via, for example, an amplifier.

Figure 12:
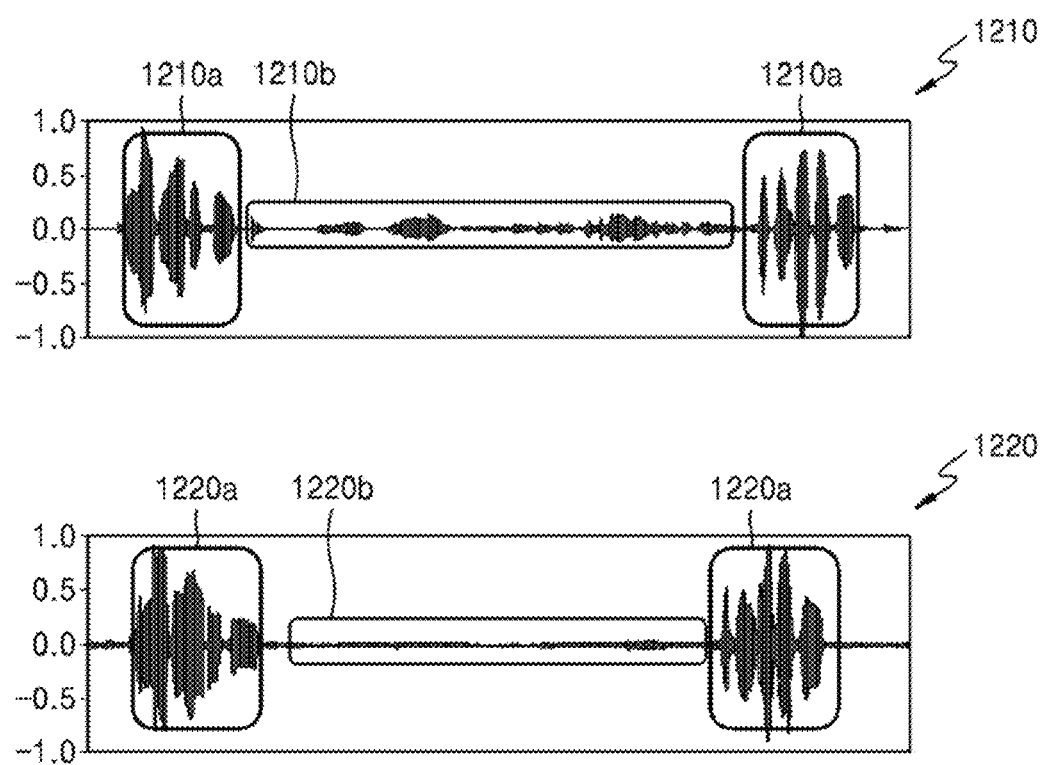
FIG. 12 is a view illustrating a user voice signal generated by a frequency detector according to an embodiment.

FIG. 12 is a view illustrating a user voice signal generated by a frequency detector according to an embodiment.

FIG. 12 illustrates a first graph 1210 showing a result of sensing a user voice by using the method according to the comparative example of FIG. 5, and a second graph 1220 showing a result of sensing of a user voice by the frequency detector.

The first graph 1210 shows a result of attenuating external sound by using a plurality of ambient microphones according to the comparative example of FIG. 5. The first graph 1210 shows a signal 1210*a* corresponding to a user voice, and a signal 1210*b* corresponding to external sound. It is confirmed that the signal 1210*b* corresponding to external sound was attenuated more than the signal 1210*a* corresponding to a user voice but remains at a detectable level.

The second graph 1220 shows a user voice signal generated by the frequency detector attenuating an external acoustic signal. The second graph 1220 shows a signal 1220*a* corresponding to a user voice, and a signal 1220*b* corresponding to external sound. It is seen in the second graph 1220 that the signal 1220*b* corresponding to external sound was clearly attenuated. It is seen in the second graph 1220 that the signal 1220*b* corresponding to external sound was attenuated to a level close to a silence as an undetectable level.

The frequency detector may attenuate external sound through a directivity-based arrangement of vibration structures toward an utterance point of a user voice. Alternatively, the frequency detector may attenuate external sound by attenuating some signals from among signals generated by the vibration structures, based on a threshold value. As a result, the frequency detector may attenuate an external acoustic signal by using one or both of the two above-described methods and may generate the user voice signal.

Figure 13:
FIG. 13 is a view for explaining an operation method of a signal processing apparatus, according to an embodiment.

FIG. 13 is a view for explaining an operation method of a signal processing apparatus, according to an embodiment.

Referring to FIG. 13, a user input may be received by the frequency detector 110, and frequency information generated by the frequency detector 110 may be input to the processor 120. The processor 120 may determine a type of the user input, based on the received frequency information.

The frequency detector 110 may vibrate based on the frequency of the user input, and may generate an electrical signal corresponding to the user input by sensing the vibration. The electrical signal may include the frequency information of the user input, and the frequency information may include information about the intensity or amplitude of each frequency of the user input according to time.

The processor 120 may determine a type of the user input, based on the frequency band of the user input, a duration of the user input, the magnitude of a signal, and the like. A method, performed by the processor 120, of determining the type of the user input will be described later with reference to FIGS. 14 through 16.

Figure 14:
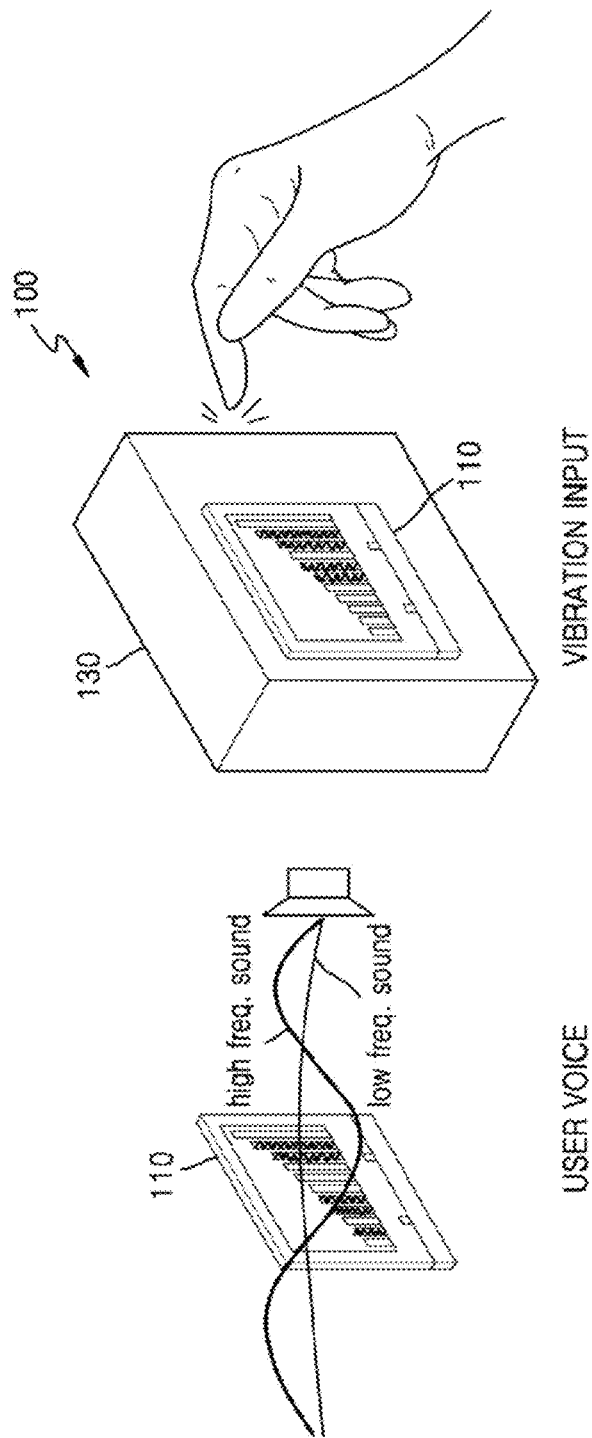
FIG. 14 illustrates a frequency detector that receives a vibration input and a user voice, according to an embodiment.

FIG. 14 illustrates a frequency detector that receives a vibration input and a user voice, according to an embodiment.

The frequency detector 110 may detect frequency information of a vibration input and frequency information of a user voice. In other words, the signal processing apparatus 100 may sense both the vibration input and the user voice by using only the frequency detector 110 without using special sensors for sensing the vibration input and the user voice.

Corresponding vibration structures may vibrate according to the frequencies of the user input received by the frequency detector 110. When high-frequency sound and low-frequency sound are both received, vibration structures having a resonance frequency of a high frequency and vibration structures having a resonance frequency of a low frequency may vibrate. When the vibration input is received, vibration structures having a resonance frequency corresponding to the vibration input may vibrate. For example, because a housing 130 of the signal processing apparatus 100 vibrates in response to the vibration input, vibration structures having a resonance frequency of the housing 130 may vibrate.

The frequency detector 110 may detect a frequency band, a time period (e.g., a length of time), and an intensity for vibrations of the vibration structures by sensing the vibrations of the vibration structures, and may generate an electrical signal including frequency information, based on the detected frequency band, the detected time period, and the detected intensity.

Figure 15A:
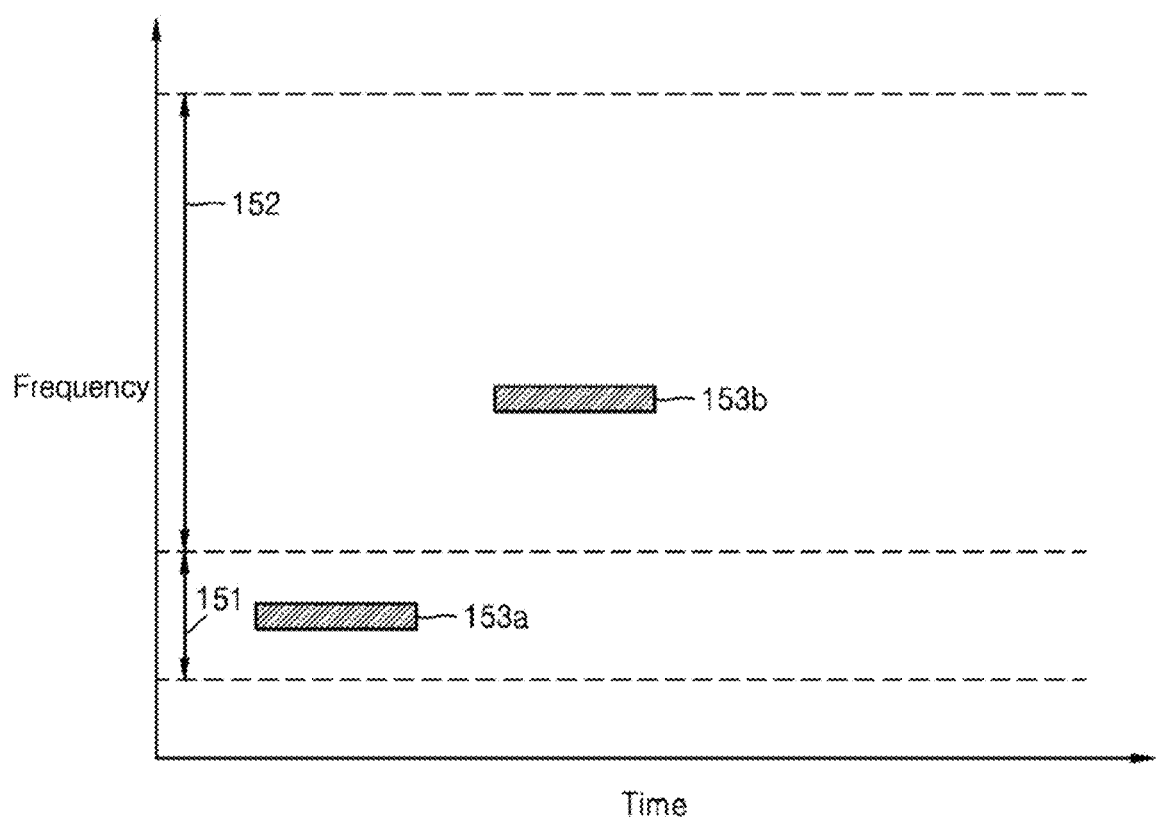
FIGS. 15A through 15C are views for explaining a method of determining the type of a user input.
Figure 15B:
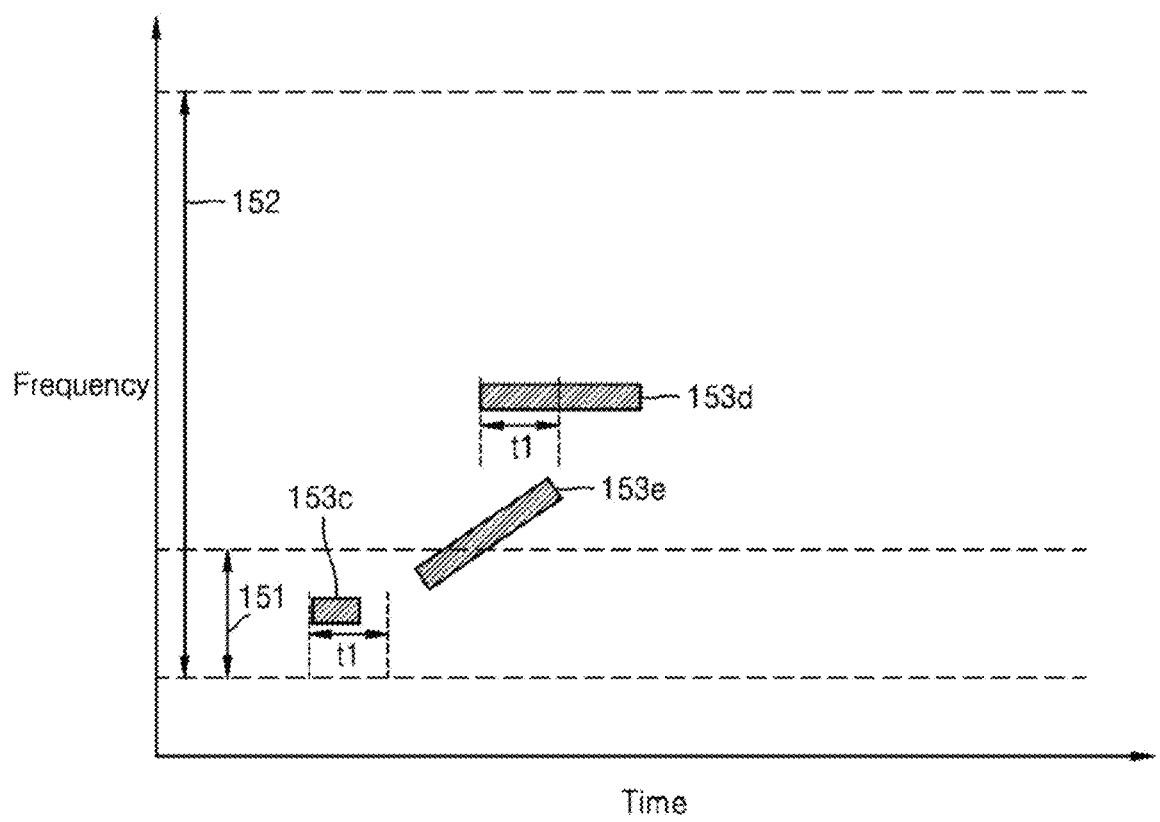
Figure 15C:
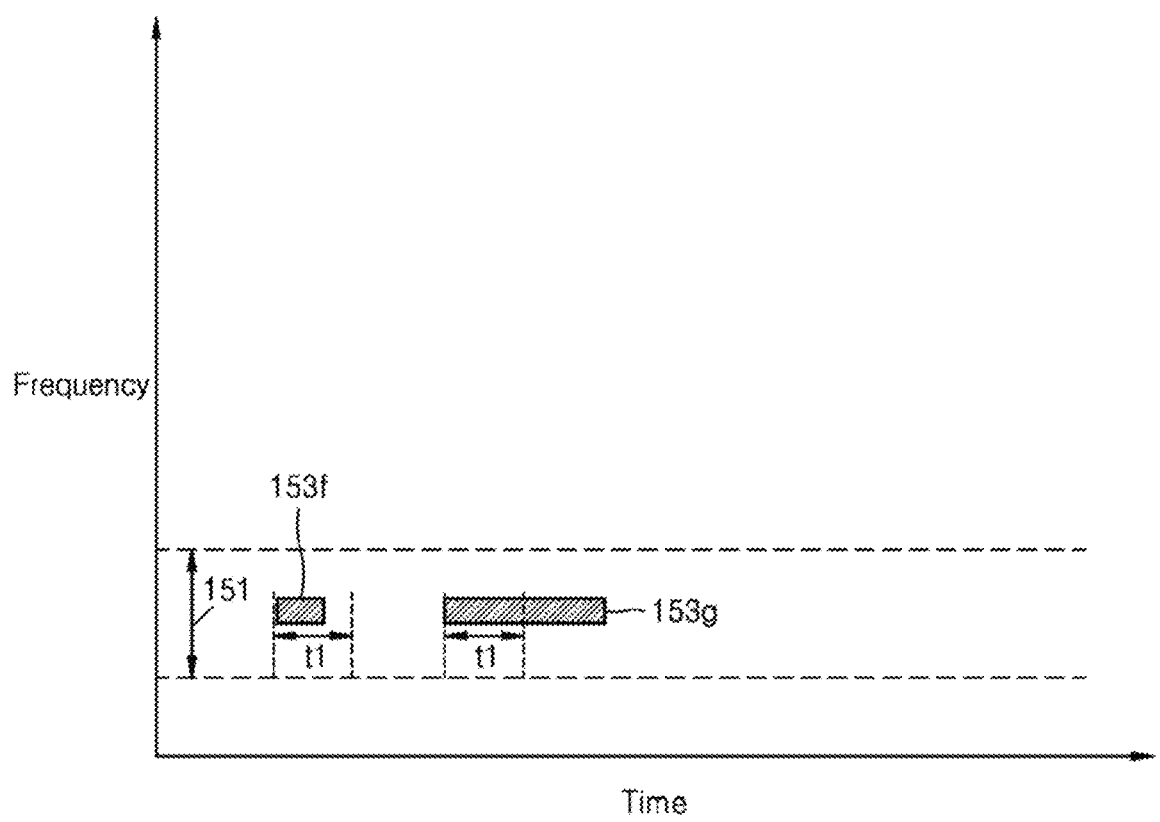

FIGS. 15A through 15C are views for explaining a method of determining the type of a user input.

FIGS. 15A through 15C illustrate graphs showing a signal including frequency information detected from the user input by a frequency detector. The graphs show a first frequency band 151 and a second frequency band 152, and also show first through seventh user inputs 153*a* through 153*g*.

A processor may determine a frequency band including a frequency detected by the frequency detector from among the first frequency band 151 and the second frequency band 152. The first frequency band 151 may correspond to the resonance frequency of a housing of a signal processing apparatus, and the second frequency band 152 may correspond to a voice grade. Because a housing of an electronic device is generally formed of a material such as plastic or iron, the resonance frequency of the housing may belong to a low frequency band compared to the voice grade. Accordingly, the processor may determine a signal of the first frequency band 151, which is a relatively low frequency band, as a vibration input, and may determine a signal of the second frequency band 152, which is a relatively high frequency band, as a user voice.

When the frequency of the first frequency band 151 is detected, the processor may determine the type of the user input as a vibration input. For example, while a signal corresponding to a user input is being maintained, when a detected frequency is included in the first frequency band 151 without deviating from the first frequency band 151, the processor may determine the type of the user input as a vibration input. When the frequency of the second frequency band 152 is detected, the processor may determine the type of the user input as a user voice.

According to the embodiment of FIG. 15A, the first frequency band 151 and the second frequency band 152 may be different from each other without a common frequency band. For example, the first frequency band 151 may be about 300 Hz to about 500 Hz, and the second frequency band 152 may be about 500 Hz to about 3400 Hz. The processor may determine a first user input 153*a* having the frequency of the first frequency band 151 as a vibration input, and may determine a second user input 153*b* having the frequency of the second frequency band 152 as a user voice.

The first frequency band 151 and the second frequency band 152 may have a certain range in common (e.g., an overlapping frequency band that is in both the first frequency band 151 and the second frequency band 152). While a user input is being maintained, when the frequency of the user input is included in a common frequency band of the first frequency band 151 and the second frequency band 152, the processor may determine a type of the user input as a vibration input.

When a user input lasts longer than a first time t1 and the frequency of the user input is included in the second frequency band 152 during the user input, the processor may determine a type of the user input as a user voice. When a signal lasting for the duration of or shorter than the first time t1 in the second frequency band 152 is detected, the processor may determine the detected signal as noise rather than a user input.

When the frequency of a user input is included in both the first frequency band 151 and a frequency band excluding the common frequency band from the second frequency band 152 (e.g., a portion of the second frequency band not overlapping the first frequency band), the processor may determine the user input as a user voice.

According to the embodiment of FIG. 15B, the first frequency band 151 and the second frequency band 152 may have a certain portion in common. For example, the first frequency band 151 may be about 300 Hz to about 500 Hz, and the second frequency band 152 may be about 300 Hz to about 3400 Hz. The processor may determine, as a vibration input, a third user input 153*c* of which a frequency is included in the common frequency band of the first frequency band 151 and the second frequency band 152. Because the third user input 153*c* lasts during or shorter than the first time t1, the processor may determine the third user input 153*c* as a tap input from among vibration inputs. The processor may determine, as a user voice, a fourth user input 153*d* of which a frequency is not included in the common frequency band and is included in only the second frequency band 152 and lasts longer than the first time t1. The processor may determine, as a user voice, a fifth user input 153*e* of which a frequency is included in both the first frequency band 151 and the frequency band excluding the common frequency band from the second frequency band 152.

When the processor determines the type of the user input as a vibration input, the processor may also determine a type of the vibration input. For a signal of the first frequency band 151, when the duration of a user input is less than or equal to the first time t1, the processor may determine a type of the user input as a tap input. For a signal of the first frequency band 151, when the duration of the user input is greater than the first time t1, the processor may determine a type of the user input as a swipe input or a bone conduction input. The first time t1 is a time length for distinguishing a tap input from the other vibration inputs, and may correspond to, for example, about 0.3 seconds to about 0.6 seconds.

According to the embodiment of FIG. 15C, the processor may determine, as a tap input, a sixth user input 153*f* having a frequency included in the first frequency band 151 during an input and lasting for the duration of or shorter than the first time t1. The processor may determine, as a swipe input or a bone conduction input, a seventh user input 153*g* having a frequency included in the first frequency band 151 during an input and lasting longer than the first time t1.

Figure 16:
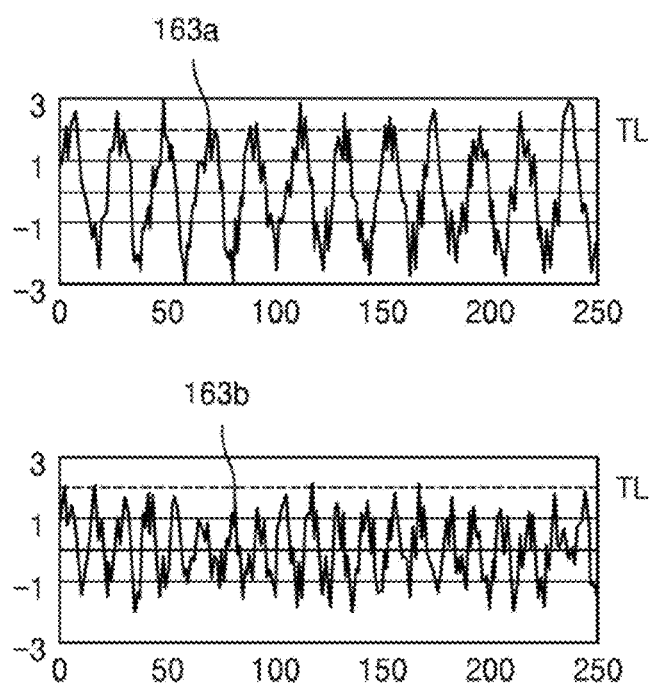
FIG. 16 is a view for explaining a method of determining the type of a user input, based on the intensity of a signal, according to an embodiment.

FIG. 16 is a view for explaining a method of determining the type of a user input, based on the intensity of a signal, according to an embodiment.

FIG. 16 illustrates a signal 163*a* corresponding to an eighth user input and a signal 163*b* corresponding to a ninth user input, which are detected from a first frequency band.

When the frequency of a received user input is included in the first frequency band, the processor may determine the user input as a vibration input. The processor may determine the user input as a vibration input and may also determine a type of the vibration input, based on the magnitude of the signal. The frequency detector may vibrate in response to the user input, and may generate an electrical signal including frequency information, based on the vibration. The processor may determine the type of the vibration input by comparing the magnitude of the generated electrical signal with a threshold level TL.

When a signal of the user input is equal to or greater than the threshold level TL, the processor may determine the type of the user input as a tap input. The tap input is an input of briefly tapping the housing of the signal processing apparatus, and has a higher vibration intensity than a swipe input and a bone conduction input that are rubbing or shaking inputs, and thus a large signal may be generated.

When the signal of the user input is less than the threshold level TL, the processor may determine the type of the user input as a swipe input or a bone conduction input. The swipe input and the bone conduction input have smaller vibration intensities than a tap input that is a tapping input, and thus a small signal may be generated.

When the magnitude of the signal exceeds the threshold level TL and the degree of excess exceeds a preset value, the processor may determine the user input as a tap input. When the magnitude of the signal is less than or equal to the threshold level TL or the degree of excess is less than or equal to the preset value even when the magnitude of the signal exceeds the threshold level TL, the processor may determine the user input as a swipe input or a bone conduction input.

According to the embodiment of FIG. 16, because the signal 163*a* of the eighth user input exceeds the threshold level TL, the processor may determine the eighth user input as a tap input. Because the signal 163*b* of the ninth user input is less than the threshold level TL, the processor may determine the ninth user input as a swipe input or a bone conduction input.

Figure 17A:
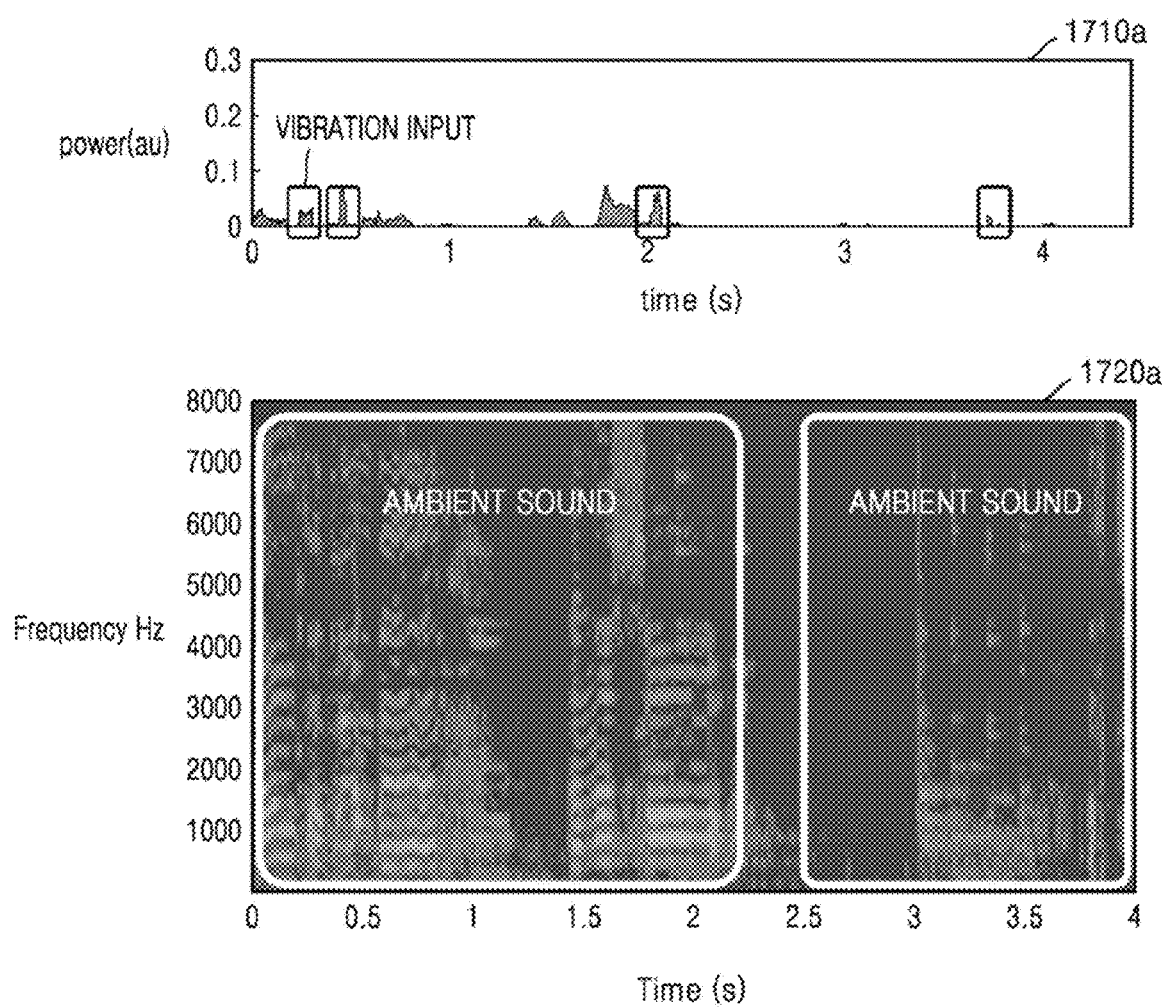
FIGS. 17A and 17B are views illustrating results of sensing a vibration input.
Figure 17B:
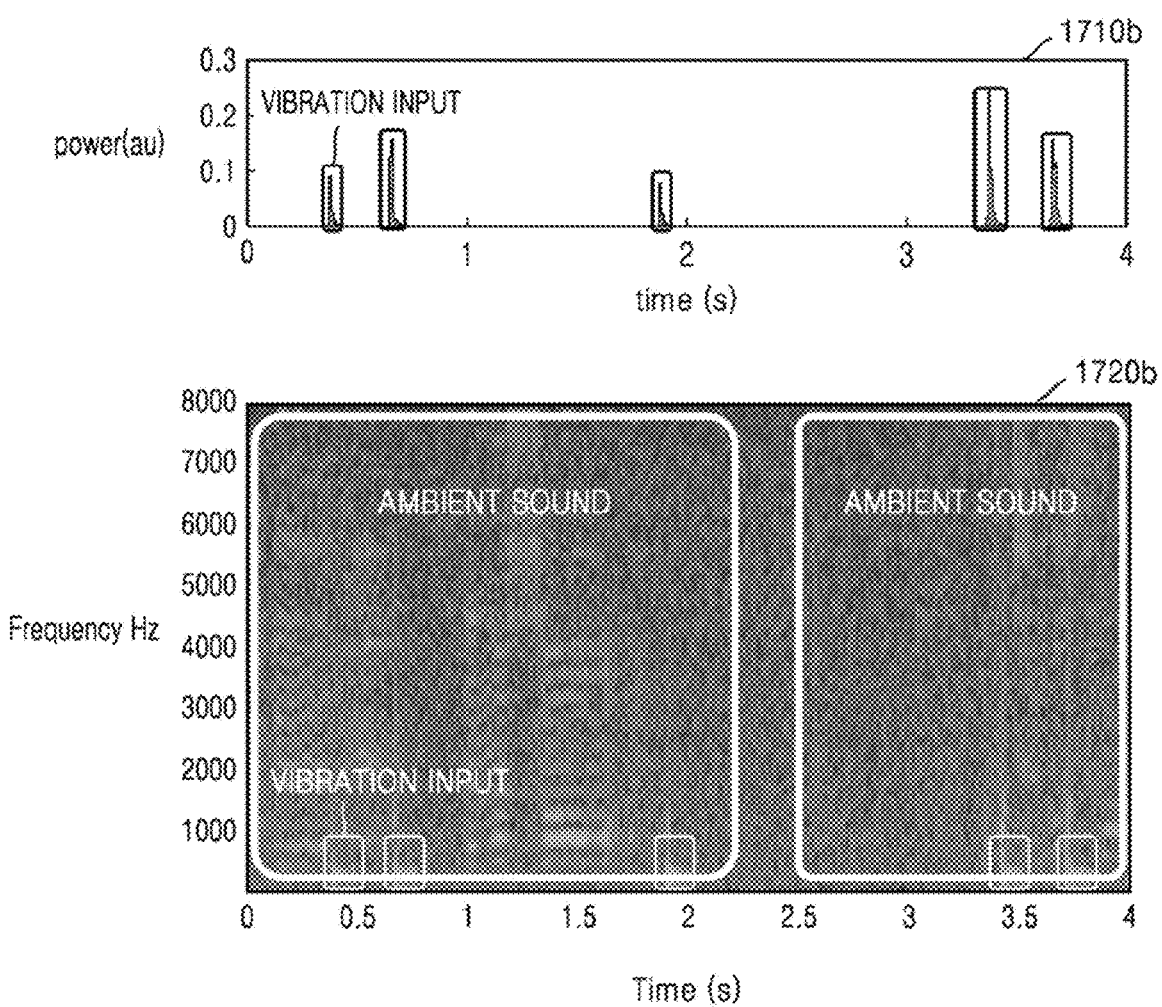

FIGS. 17A and 17B are views illustrating results of sensing a vibration input.

FIG. 17A illustrates graphs showing a result of sensing a vibration input by using the ambient microphones 510 of FIG. 5. A third graph 1710*a* shows the magnitude of a signal detected over time in the first frequency band, and a fourth graph 1720*a* shows a spectrogram including frequency information over time. The third graph 1710*a* and the fourth graph 1720*a* correspond to each other, and show signals received at an identical time.

In the third graph 1710*a*, four points where vibration inputs are received are marked. However, the third graph 1710*a* shows that signals having greater power than vibration inputs are detected even at points where the vibration inputs are not received, and that signals having too small power to be detected are detected even at the points where the vibration inputs are received. Thus, unless the times at which vibration inputs are received are known in advance through the third graph 1710*a*, the vibration inputs are not clearly distinguished.

The fourth graph 1720*a* shows a result of reception of the vibration inputs at the same points as those in the third graph 1710*a*. However, in the fourth graph 1720*a*, the vibration inputs are not clearly distinguished in the first frequency band, which is the frequency band of the vibration inputs.

Thus, when the ambient microphones 510 of FIG. 5 are used, the vibration inputs are not sensed.

FIG. 17B illustrates graphs showing a result of sensing of vibration inputs by a signal processing apparatus. A fifth graph 1710*b* shows the magnitude of a signal detected over time in the first frequency band, and a sixth graph 1720*b* shows a spectrogram including frequency information over time. The fifth graph 1710*b* and the sixth graph 1720*b* correspond to each other, and show signals received at an identical time.

In the fifth graph 1710*b*, five points where vibration inputs are received are marked. The fifth graph 1710*b* shows that signals are not detected at points where no vibration inputs are received, and that signals having power large enough to be detected are detected at the points where the vibration inputs are received. Thus, the times at which the vibration inputs are received are clearly distinguished through the fifth graph 1710*b*, and thus the signal processing apparatus may sense the vibration inputs when the vibration inputs are received.

The sixth graph 1720*b* shows a result of reception of vibration inputs at the same points as those in the fifth graph 1710*b*. The sixth graph 1720*b* shows that frequencies are clearly detected at times when vibration inputs are received in the first frequency band, which is the frequency band of the vibration inputs.

Thus, the signal processing apparatus may effectively sense a vibration input in any environment by clearly distinguishing the vibration input from overall sound.

Figure 18A:
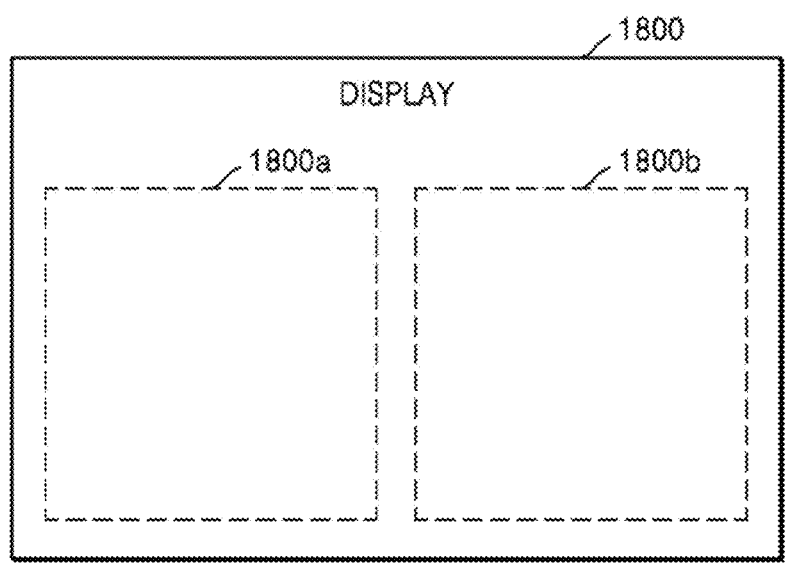
FIGS. 18A and 18B are diagrams showing displays according to embodiments.
Figure 18B:
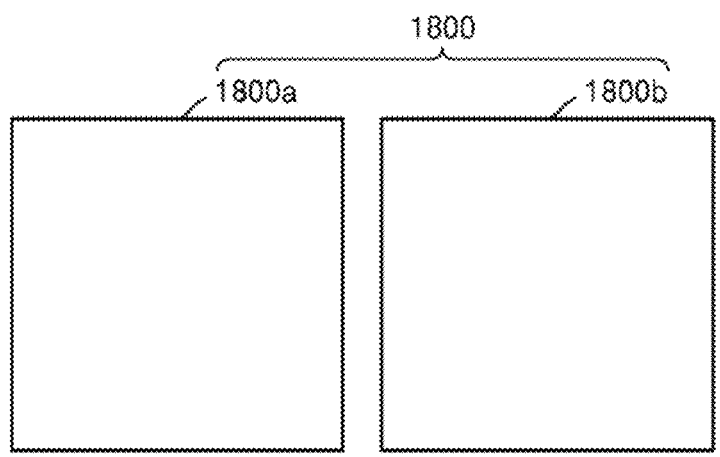

FIGS. 18A and 18B are diagrams showing displays according to embodiments.

The signal processing apparatus may further include a display 1800 that outputs visual information. The display 1800 may display a variety of visual information in response to control by the processor. The processor may perform a function corresponding to a user voice (e.g., a first function) or a function corresponding to a vibration input (e.g., a second function). The processor may display a result of execution of the function on the display 1800. When the processor performs both the function corresponding to a user voice and the function corresponding to a vibration input, the processor may display results of execution of the functions on different regions of the display 1800.

Referring to FIG. 18A, the display 1800 may include a first region 1800*a* and a second region 1800*b* within one frame. For example, the display 1800 may display the result of execution of the function corresponding to a user voice on the first region 1800*a*, and may display the result of execution of the function corresponding to a vibration input on the second region 1800*b*.

Referring to FIG. 18B, the display 1800 may include a first region 1800*a* and a second region 1800*b* formed on independent frames. For example, the display 1800 may display the result of execution of the function corresponding to a user voice on the first region 1800*a*, and may display the result of execution of the function corresponding to a vibration input on the second region 1800*b*.

Figure 19A:
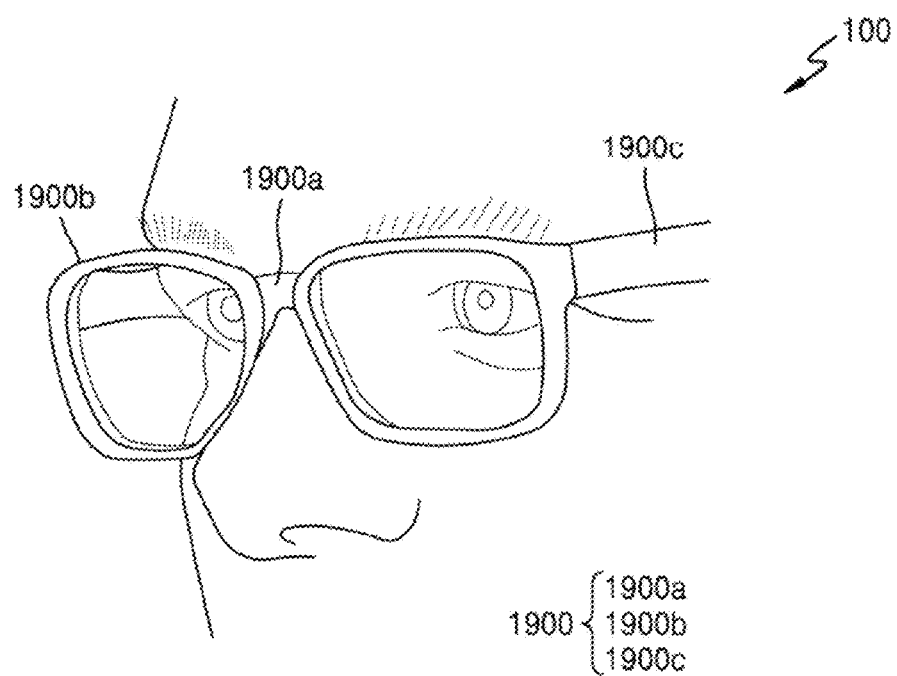
FIGS. 19A through 19C are views illustrating embodiments in which a signal processing apparatus is an eyeglasses-type wearable device.
Figure 19B:
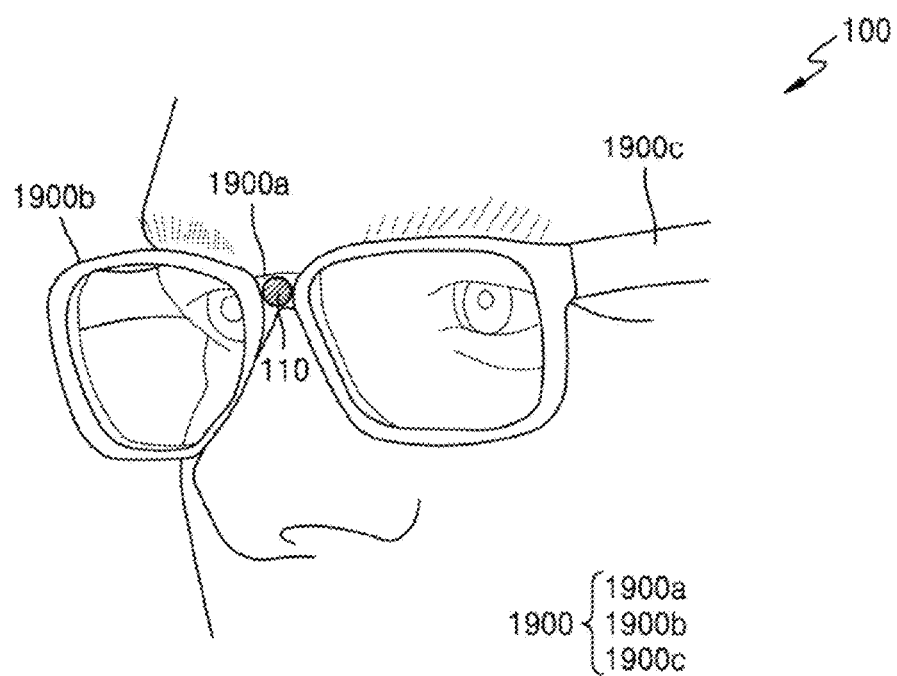
Figure 19C:
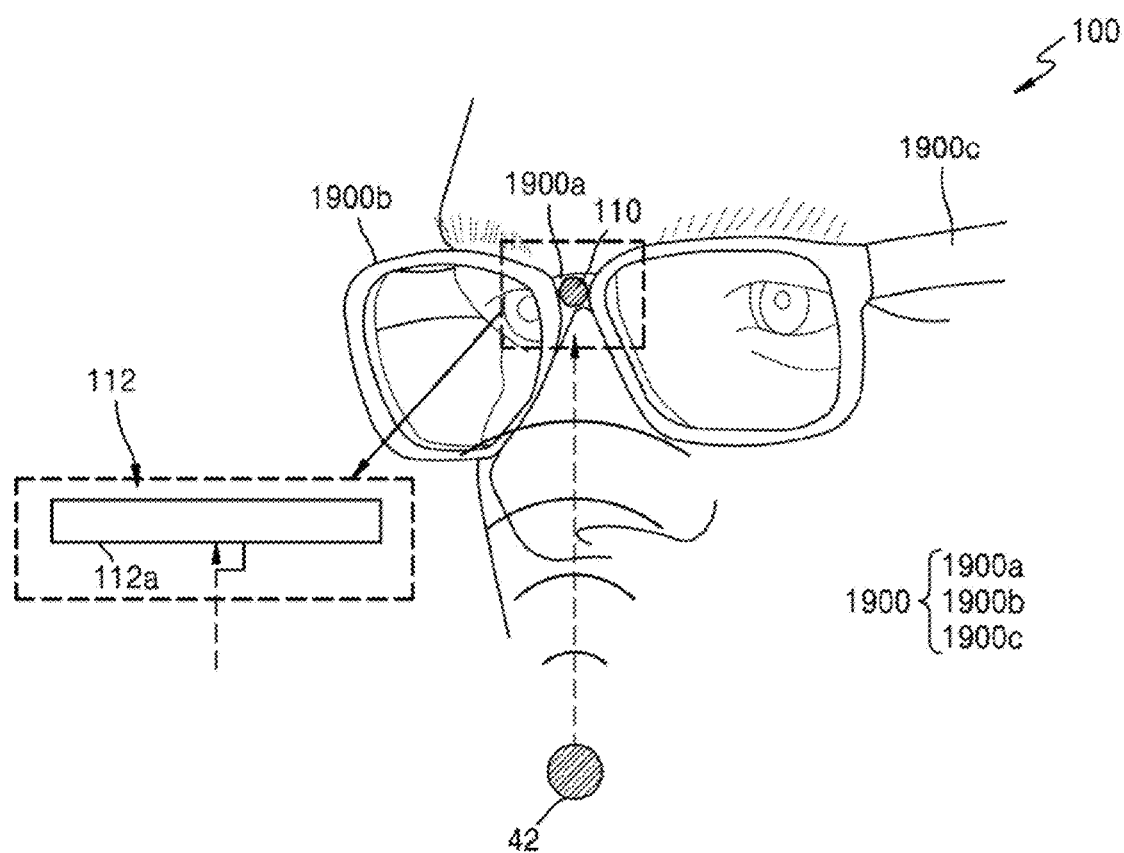

FIGS. 19A through 19C are views illustrating embodiments in which a signal processing apparatus is an eyeglass wearable device.

Referring to FIG. 19A, the signal processing apparatus 100 is an eyeglass wearable device and may include an eyeglass frame 1900. The eyeglass frame 1900 may include an eyeglass bridge 1900*a*, eyeglass rims 1900*b*, and eyeglass temples 1900*c*.

A frequency detector may be arranged on the eyeglass frame 1900. The frequency detector may be arranged at various locations on the eyeglass frame 1900 according to inputs to be received. For example, the frequency detector may be arranged on the eyeglass bridge 1900*a* or the eyeglass rims 1900*b* so as to receive a user voice at closer locations. The frequency detector may be arranged on the eyeglass temples 1900*c* so as to be easily contacted by a hand of a user.

Although FIG. 19A illustrates that the signal processing apparatus 100 is an eyeglass wearable device, this is merely an example. The signal processing apparatus 100 may be in the form of a watch or bracelet worn on the wrist, in the form of a necklace worn on the neck, or in various other types of wearable devices such as earphones and headphones worn on the ears. The signal processing apparatus 100 may correspond to any type of wearable device as long as it may be worn by a user.

Referring to FIG. 19B, the frequency detector 110 may be arranged on the eyeglass bridge 1900*a* of the signal processing apparatus 100.

Because an utterance point of a user voice corresponds to a mouth or lips of the user, the frequency detector 110 may be arranged on the eyeglass bridge 1900*a* such as to correspond to the utterance point. Alternatively, the frequency detector 110 may be arranged on the eyeglass temples 1900*c* to more effectively receive a vibration input from the user's lateral direction. However, as described above, the frequency detector 110 may be arranged at various locations within the eyeglass frame 1900.

Referring to FIG. 19C, a user voice is propagated from the utterance point 42 of the user voice toward the frequency detector 110.

The utterance point 42 of the user voice may be a location corresponding to the mouth or lips of the user. The user voice may be propagated to the frequency detector 110 and may be received by the one surface 112*a* of the vibrator 112 of the frequency detector 110. When the user voice is propagated perpendicular to the one surface 112*a* of the vibrator 112, the user voice may be sensed with a highest sensitivity by the frequency detector 110.

Thus, as shown in FIG. 19C, the frequency detector 110 may be arranged in the signal processing apparatus 100 such that a direction from the utterance point 42 of the user voice to the one surface 112*a* is perpendicular. When a voice of an outside is received from the front side or lateral side of the user, the outside voice is received in a direction parallel to the one surface 112*a* of the frequency detector 110, and thus the outsider voice may be sensed with a lowest sensitivity by the frequency detector 110 or may not be sensed. Due to this arrangement, the frequency detector 110 may attenuate external sound and emphasize the user voice. The user voice being emphasized may not refer to the user voice being amplified, but refer to the user voice being clarified due to attenuation of other signals.

However, because maintaining a perpendicular arrangement is difficult due to restrictions in process or use, the frequency detector 110 may be arranged such that the one surface 112a and a traveling direction of the user voice from 60° to 120°. As described above with reference to FIGS. 10A and 10B, even when the frequency detector 110 is disposed at the above angle, the frequency detector 110 may effectively sense the user voice from which the external sound has been attenuated.

Figure 20:
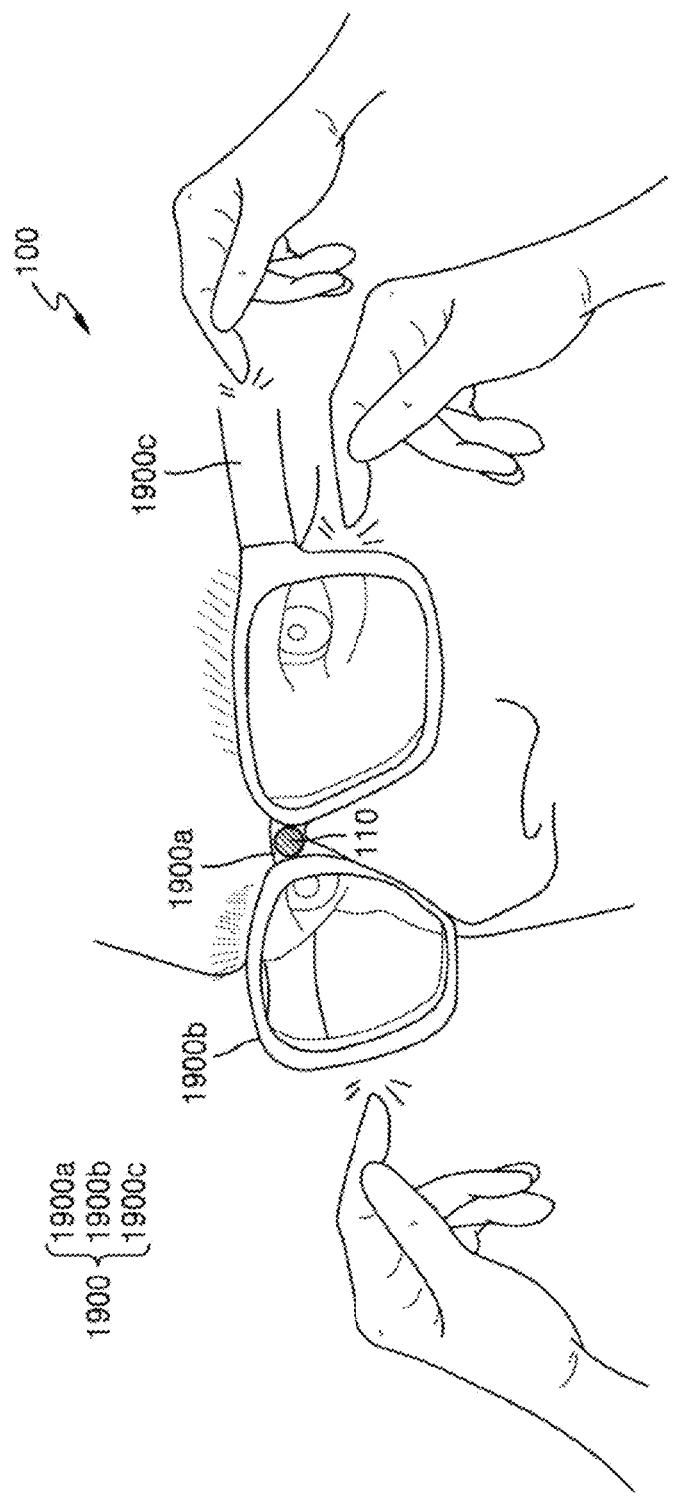
FIG. 20 is a view illustrating an aspect in which a vibration input is received by a signal processing apparatus according to an embodiment.

FIG. 20 is a view illustrating an aspect in which a vibration input is received by a signal processing apparatus according to an embodiment.

Referring to FIG. 20, a user inputs a vibration input to various locations on an eyeglass frame.

The vibration input may be received by various locations on the signal processing apparatus 100, such as the eyeglass bridge 1900a, the eyeglass rims 1900b, or the eyeglass temples 1900c. A housing of the signal processing apparatus 100 may vibrate in response to the vibration input, and the vibration may be transmitted to the frequency detector 110, and thus the frequency detector 110 may also vibrate. The frequency detector 110 may detect frequency information of the vibration input by sensing the vibration.

FIGS. 21A through 21F are views illustrating operations of the signal processing apparatus 100 with respect to various vibration inputs.

Referring to FIGS. 21A through 21F, the signal processing apparatus 100 may receive various vibration inputs. A display may include a first region (for example, a right eyeglass based on a user) and a second region (for example, a left eyeglass based on the user) and may display different pieces of visual information on the first and second regions. The signal processing apparatus 100 may display visual information corresponding to a vibration input on the display. For example, the signal processing apparatus 100 may display visual information corresponding to a user voice on the first region, and may display visual information corresponding to a vibration input on the second region.

The signal processing apparatus 100 may receive a vibration input, a user voice, and external sound generated in front of the signal processing apparatus 100. Because the external sound is received in the front direction of the frequency detector 110, the external sound may be received parallel to one surface formed by a vibrator or at an angle close to parallel to the one surface. Thus, the frequency detector 110 may attenuate the external sound and may effectively sense the user voice and the vibration input.

Figure 21A:
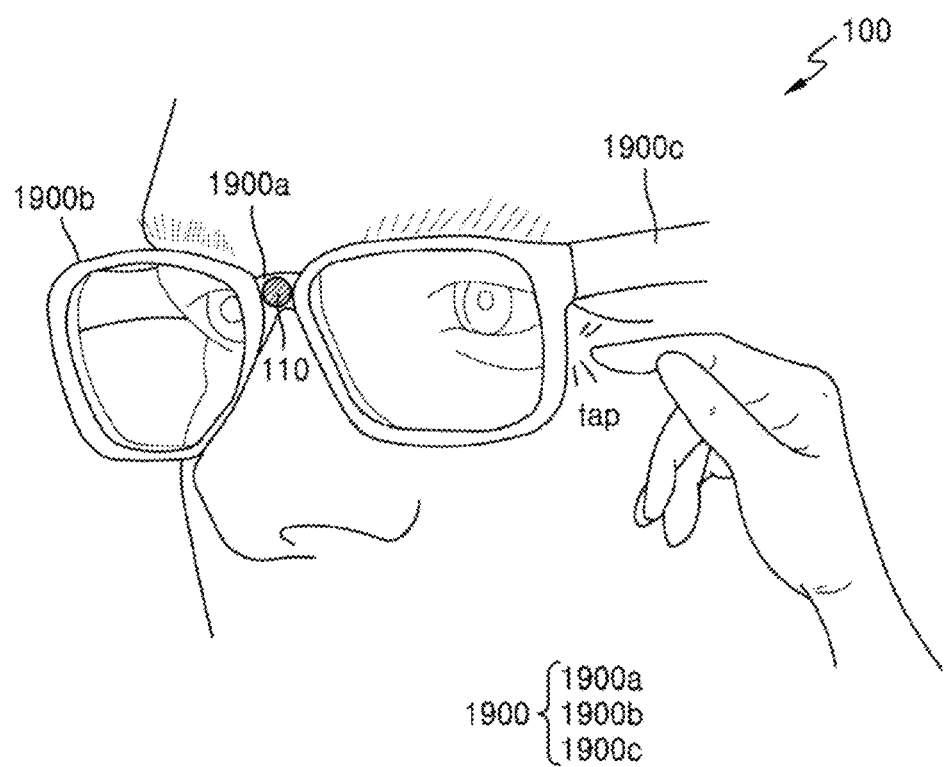
FIGS. 21A through 21F are views illustrating operations of a signal processing apparatus with respect to various vibration inputs.

According to the embodiment of FIG. 21A, the signal processing apparatus 100 may receive a tap input. The signal processing apparatus 100 may play or stop an image or music in response to the tap input, and may display visual information corresponding to the play or stop on the display.

Figure 21B:
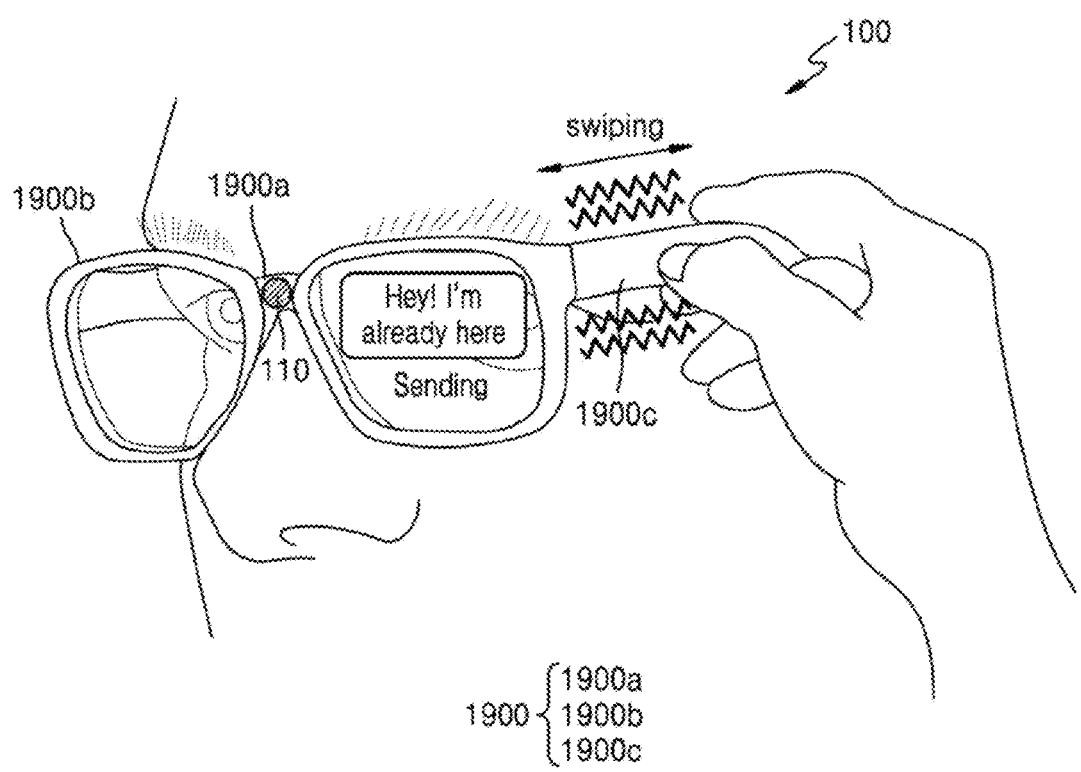
Figure 21C:
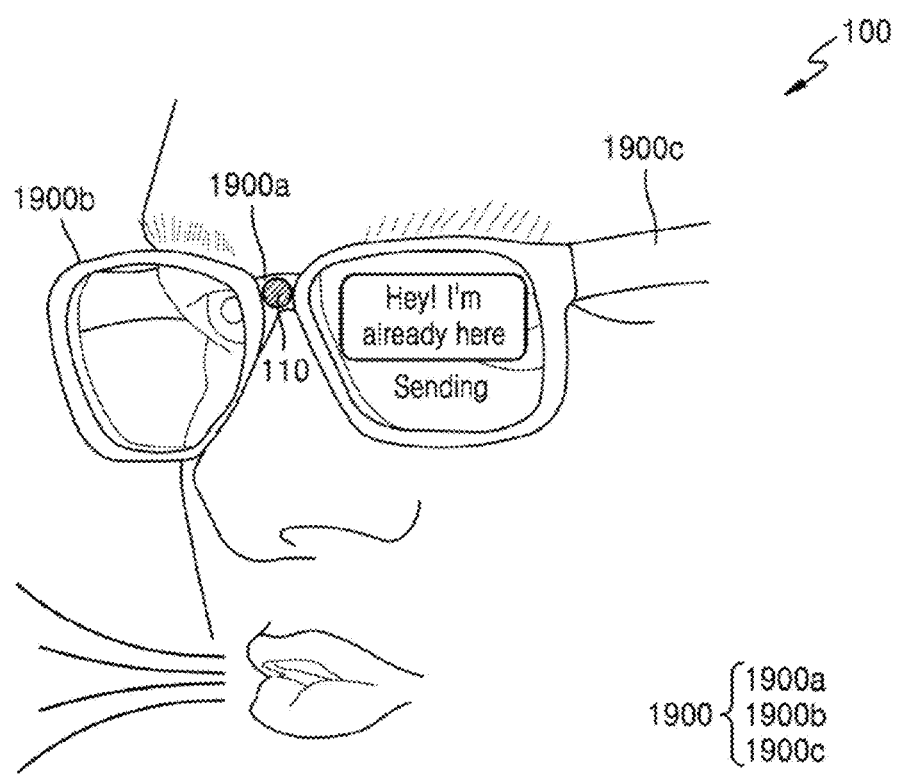

According to the embodiment of FIG. 21B, the signal processing apparatus 100 may receive a swipe input. The swipe input may be an input by a hand of a user contacting the eyeglass temples 1900c and then moving in one direction until the contact is released. Due to the swipe input, a vibration may occur in the eyeglass temples 1900c and may be transmitted to the frequency detector 110. The signal processing apparatus 100 may transmit a message in response to the swipe input and may display visual information corresponding to the message transmission on the display.

For example, the processor may determine a vibration input lasting longer than a first length of time and shorter than a second length of time to be a swipe input. The second length of time may correspond to, for example, 1.5 seconds to 3 seconds.

According to the embodiments of FIGS. 21C through 21F, the signal processing apparatus 100 may receive a bone conduction input. According to the embodiment of FIG. 21C, the signal processing apparatus 100 may receive a bone conduction input based on a vibration generated due to user's wind blowing. The signal processing apparatus 100 may transmit a message in response to the bone conduction input and may display visual information corresponding to the message transmission on the display.

For example, the processor may determine a vibration input lasting longer than the first length of time and shorter than the second length of time to be a bone conduction input generated due to user's wind blowing. However, the processor may determine a user input as a swipe input when a signal having a magnitude greater than or equal to a preset value is detected, and may determine a user input as a bone conduction input generated due to user's wind blowing when a signal having a magnitude less than the preset value is detected.

Figure 21D:
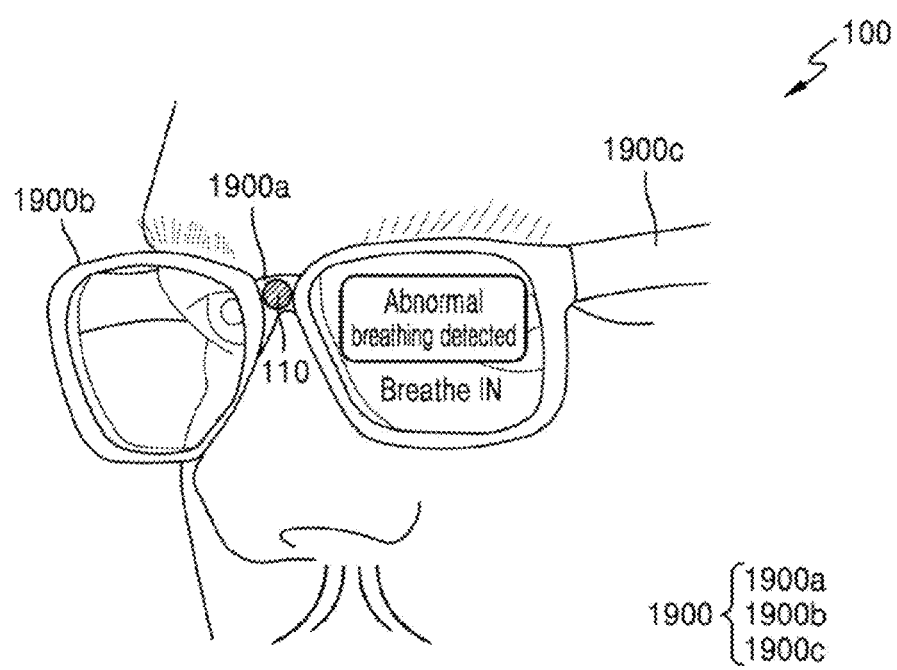

According to the embodiment of FIG. 21D, the signal processing apparatus 100 may receive a bone conduction input based on a vibration generated due to user's breathing. The signal processing apparatus 100 may determine a breathing state of the user in response to the bone conduction input and may display visual information corresponding to the breathing state on the display.

For example, the processor may determine a vibration input lasting longer than the second length of time to be a bone conduction input generated due to user's breathing.

Figure 21E:
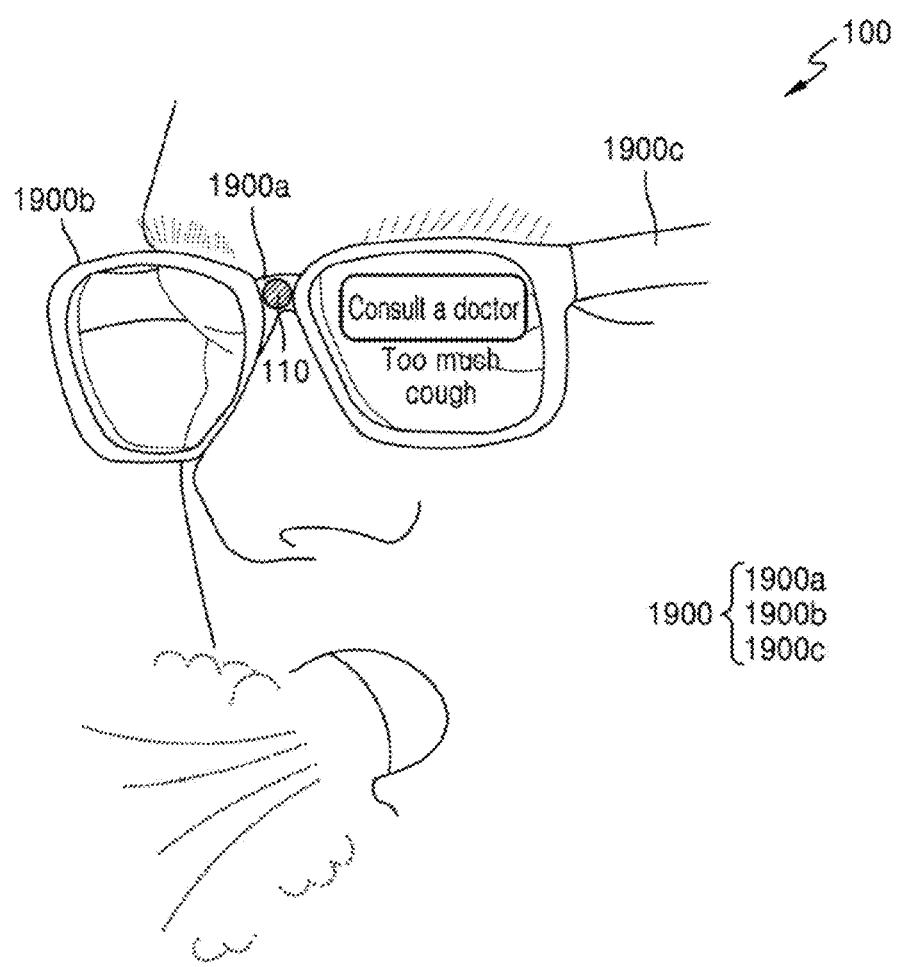

According to the embodiment of FIG. 21E, the signal processing apparatus 100 may receive a bone conduction input based on a vibration generated due to user's coughing. The signal processing apparatus 100 may determine a health state of the user in response to the bone conduction input and may display visual information corresponding to the health state on the display.

For example, when a signal lasting equal to or shorter than the first length of time and having a magnitude equal to or greater than the preset value is repeatedly continued, the processor may determine a user input as a bone conduction input caused by user's coughing.

Figure 21F:
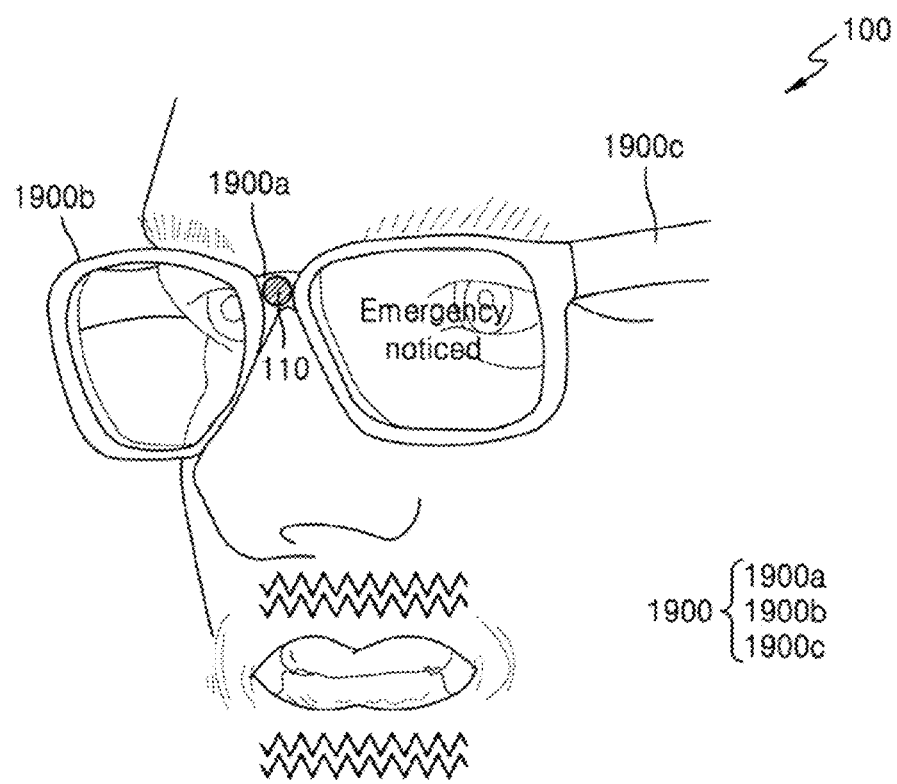

According to the embodiment of FIG. 21F, the signal processing apparatus 100 may receive a bone conduction input based on a vibration generated due to user's teeth grinding. The signal processing apparatus 100 may determine a health state of the user in response to the bone conduction input and may display visual information corresponding to the health state on the display.

For example, the processor may determine a user input as a bone conduction input caused by user's teeth grinding, based on the pattern or the like of a repeated vibration input.

Various functions performed based on the above-described user inputs are merely examples and may be variously modified and implemented.

Figure 22:
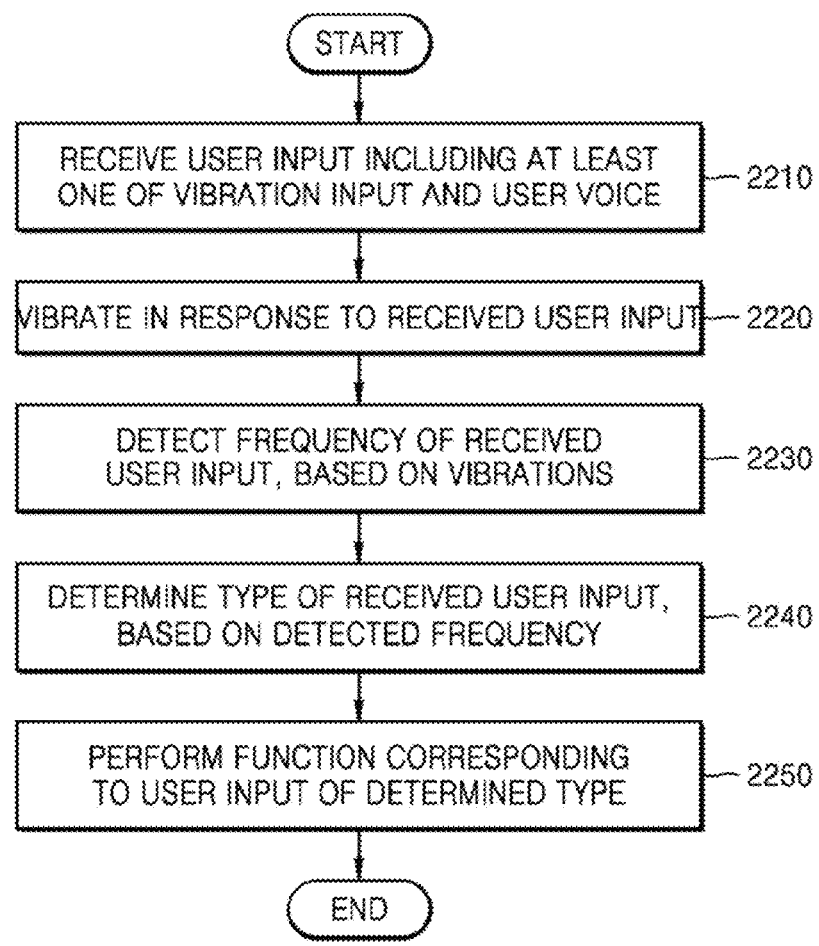
FIG. 22 is a flowchart of a signal processing method according to an embodiment.

FIG. 22 is a flowchart of a signal processing method according to an embodiment.

Referring to FIG. 22, the signal processing method includes operations serially performed by the signal processing apparatus 100 of FIG. 1. Thus, although omitted, the description of the signal processing apparatus 100 given above with reference to FIG. 1 and the like may also apply to the signal processing method of FIG. 22.

In operation 2210, the signal processing apparatus 100 may receive a user input including at least one of a vibration input and a user voice.

In operation 2220, the signal processing apparatus 100 may vibrate in response to the user input.

In the signal processing apparatus 100, a plurality of vibration structures that sense vibration inputs and sounds of different frequency bands may vibrate based on the frequency of the user input.

The signal processing apparatus 100 may generate electrical signals respectively corresponding to the vibrations of the plurality of vibration structures.

In operation 2230, the signal processing apparatus 100 may detect the frequency of the received user input, based on the vibrations.

The signal processing apparatus 100 may generate electrical signals respectively corresponding to the vibrations of the plurality of vibration structures.

In operation 2240, the signal processing apparatus 100 may determine a type of the received user input, based on the detected frequency.

The signal processing apparatus 100 may determine the type of the received user input as a vibration input when a frequency of a first frequency band is detected, and may determine the type of the received user input as a user voice when a frequency of a second frequency band is detected.

When the received user input lasts longer than a first length of time and the frequency of the lasting user input is included in the second frequency band, the signal processing apparatus 100 may determine the type of the received user input as a user voice.

When the frequency of the received user input is included in a common frequency band of the first frequency band and the second frequency band while the received user input is being continued, the signal processing apparatus 100 may determine the type of the received user input as a vibration input.

When the frequency of the received user input is included in both the first frequency band and a frequency band excluding the first frequency band from the second frequency band, the signal processing apparatus 100 may determine the type of the received user input as a user voice.

When the frequency of the received user input is included in the first frequency band while the received user input is being continued, and the duration of the received user input is less than or equal to the first length of time, the signal processing apparatus 100 may determine the type of the received user input as a tap input. On the other hand, when the duration of the received user input exceeds the first length of time, the signal processing apparatus 100 may determine the type of the received user input as a swipe input or a bone conduction input.

When the frequency of the received user input is included in the first frequency band while the received user input is being continued, and the magnitude of an electrical signal generated based on a vibration is equal to or greater than a threshold level, the signal processing apparatus 100 may determine the type of the received user input as a tap input. On the other hand, when the magnitude of the electrical signal generated based on the vibration is less than the threshold level, the signal processing apparatus 100 may determine the type of the received user input as a swipe input or a bone conduction input.

In operation 2250, the signal processing apparatus 100 may perform a function corresponding to a user input of the determined type.

When the received user input is determined to include both a user voice and a vibration input, the signal processing apparatus 100 may perform a function corresponding to the user voice and a function corresponding to the vibration input.

The signal processing apparatus 100 may identify the user, based on a combination of the user voice and the vibration input.

The signal processing apparatus 100 may display results of each execution of the function corresponding to the user voice and the function corresponding to the vibration input on different regions on the display.

The signal processing apparatus 100 may sense both the user voice and the vibration input by using one sensor called the frequency detector 110, without using a special acoustic sensor and a special vibration sensor in order to sense the user voice and the vibration input. Accordingly, the signal processing apparatus 100 does not require comparisons and calculations with respect to signals generated from special sensors, thus enabling efficient processing. Moreover, the signal processing apparatus 100 senses the user voice and the vibration input by using only the frequency detector 110, thus enabling reductions in process costs and power consumption and achieving device miniaturization.

A computer readable storage medium may have embodied thereon at least one program including instructions for performing the above-described operation method of FIG. 22. Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a random-access memory (RAM), or a flash memory. Examples of the program commands are advanced language codes that can be executed by a computer by using an interpreter or the like as well as machine language codes made by a compiler.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A signal processing apparatus comprising:
   a frequency detector configured to:
      receive a user input comprising at least one of a vibration input and a user voice;
      vibrate in response to the received user input; and
      detect a frequency of the user input, based on the vibration; and
   a processor configured to:
      determine a type of the user input received by the frequency detector, based on the frequency detected by the frequency detector; and
      perform a function corresponding to the user input of the determined type, wherein the processor is further configured to:
  determine that the type of the received user input is the vibration input when the detected frequency is in a first frequency band, the vibration input being a touch input comprising at least one of a tap input and a swipe input;
  determine that the type of the received user input is the user voice when the detected frequency is in a second frequency band and when the received user input lasts longer than a first length of time; and
  determine that the type of the received user input is noise when the detected frequency is in the second frequency band and when the received user input lasts less than the first length of time,
wherein the processor is further configured to determine that the type of the received user input is the user voice when the first frequency band and the second frequency band overlap with each other, and the detected frequency of the received user input changes from being included in the first frequency band to a portion of the second frequency band not overlapping the first frequency band over time.

2. The signal processing apparatus of claim 1, wherein the frequency detector comprises a plurality of vibration structures that sense vibration inputs and sounds of different frequency bands, and
  wherein each of the plurality of vibration structures comprises a vibrator configured to vibrate based on the frequency of the user input as the user input is received.

3. The signal processing apparatus of claim 2, wherein each of the plurality of vibration structures further comprises a vibration detector configured to receive a vibration of the vibrator and generate an electrical signal corresponding to the received vibration.

4. The signal processing apparatus of claim 1, wherein the processor is further configured to determine that the type of the received user input is the vibration input when the frequency of the received user input is in an overlapping frequency band that is in both the first frequency band and the second frequency band while the received user input lasts.

5. The signal processing apparatus of claim 1, wherein the first frequency band corresponds to a resonance frequency band of a housing of the signal processing apparatus, and
  wherein the second frequency band corresponds to a voice grade.

6. The signal processing apparatus of claim 1, wherein the processor is further configured to:
  determine that the type of the received user input is the tap input when the frequency of the user input is in the first frequency band while the received user input lasts, and a duration of the user input is less than or equal to the first length of time, and
  determine that the type of the user input is the swipe input or a bone conduction input when the duration of the user input exceeds the first length of time.

7. The signal processing apparatus of claim 1, wherein the processor is further configured to:
  determine that the type of the received user input is the tap input when the frequency of the user input is in the first frequency band while the received user input lasts, and a magnitude of an electrical signal generated by the frequency detector, based on the vibration, is equal to or greater than a threshold level, and
  determine that the type of the user input is the swipe input or a bone conduction input when the magnitude of the electrical signal is less than the threshold level.

8. The signal processing apparatus of claim 1, wherein the processor is further configured to perform a first function corresponding to the user voice and a second function corresponding to the vibration input when the received user input is determined to include both the user voice and the vibration input.

9. The signal processing apparatus of claim 8, wherein the processor is further configured to identify a user who uses the signal processing apparatus, based on a combination of the user voice and the vibration input.

10. The signal processing apparatus of claim 8, wherein the signal processing apparatus further comprises a display configured to output visual information, and
  wherein the processor is further configured to control the display to display results of performing the first function corresponding to the user voice and the second function corresponding to the vibration input on different regions on the display.

11. The signal processing apparatus of claim 1, wherein the signal processing apparatus comprises an eyeglass wearable device, and
  wherein the frequency detector is arranged on an eyeglass frame of the eyeglass wearable device.

12. A signal processing method comprising:
  receiving a user input comprising at least one of a vibration input and a user voice;
  vibrating in response to the received user input;
  detecting a frequency of the received user input, based on the vibration;
  detecting a type of the received user input, based on the detected frequency; and
  performing a function corresponding to the user input of the determined type,
  wherein the detecting of the type of the received user input comprises:
    determining that the type of the received user input is the vibration input when the detected frequency is in a first frequency band, the vibration input being a touch input comprising at least one of a tap input and a swipe input;
    determining that the type of the received user input is the user voice when the detected frequency is in a second frequency band and when the received user input lasts longer than a first length of time;
    determining that that the type of the received user input is noise when the detected frequency is in the second frequency band and when the received user input lasts less than the first length of time; and
    determining that the type of the received user input is the user voice when the first frequency band and the second frequency band overlap with each other, and the detected frequency of the received user input changes from being included in the first frequency band to a portion of the second frequency band not overlapping the first frequency band over time.

13. The signal processing method of claim 12, wherein the vibrating in response to the received user input comprises vibrating based on the frequency of the received user input, wherein the vibrating is performed by a plurality of vibration structures for sensing vibration inputs and sounds of different frequency bands.

14. The signal processing method of claim 12, wherein the performing of the function corresponding to the user input of the determined type comprises performing a first function corresponding to the user voice and a second function corresponding to the vibration input when the received user input is determined to include both the user voice and the vibration input.

15. The signal processing method of claim 12, wherein the performing of the function corresponding to the user input of the determined type comprises displaying results of performing a first function corresponding to the user voice and a second function corresponding to the vibration input on different regions on a display.

* * * * *